(12) United States Patent
Merriman et al.

(10) Patent No.: US 10,713,275 B2
(45) Date of Patent: Jul. 14, 2020

(54) SYSTEM AND METHOD FOR AUGMENTING CONSENSUS ELECTION IN A DISTRIBUTED DATABASE

(71) Applicant: MongoDB, Inc., New York, NY (US)

(72) Inventors: Dwight Merriman, New York, NY (US); Eliot Horowitz, New York, NY (US); Andrew Michalski, Brooklyn, NY (US); Therese Avitabile, New York, NY (US)

(73) Assignee: MongoDB, Inc., New York, NY (US)

( * ) Notice: Subject to any disclaimer, the term of this patent is extended or adjusted under 35 U.S.C. 154(b) by 594 days.

(21) Appl. No.: 15/200,975

(22) Filed: Jul. 1, 2016

(65) Prior Publication Data

US 2017/0032007 A1   Feb. 2, 2017

Related U.S. Application Data

(60) Provisional application No. 62/188,097, filed on Jul. 2, 2015.

(51) Int. Cl.
| | |
|---|---|
| *G06F 17/30* | (2006.01) |
| *G06F 16/27* | (2019.01) |
| *G06F 16/21* | (2019.01) |
| *G06F 16/25* | (2019.01) |

(52) U.S. Cl.
CPC .............. *G06F 16/27* (2019.01); *G06F 16/21* (2019.01); *G06F 16/25* (2019.01)

(58) Field of Classification Search
CPC ......... G06F 17/30575; G06F 17/30557; G06F 17/30289; G06F 16/27; G06F 16/21; G06F 16/25
See application file for complete search history.

(56) References Cited

U.S. PATENT DOCUMENTS

| | | |
|---|---|---|
| 4,918,593 A | 4/1990 | Huber |
| 5,379,419 A | 1/1995 | Heffernan et al. |
| 5,416,917 A | 5/1995 | Adair et al. |
| 5,471,629 A | 11/1995 | Risch |
| 5,551,027 A | 8/1996 | Choy et al. |

(Continued)

OTHER PUBLICATIONS

Chang et al., Bigtable: a distributed storage system for structured data. OSDI'06: Seventh Symposium on Operating System Design and Implementation. Nov. 2006.

(Continued)

*Primary Examiner* — Huawen A Peng
(74) *Attorney, Agent, or Firm* — Wolf, Greenfield & Sacks, P.C.

(57) ABSTRACT

According to one aspect, a distributed database system is configured to manage write operations received from database clients and execute the write operations at primary nodes. The system then replicates received operations across a plurality of secondary nodes. Write operation can include safe write requests such that the database guaranties the operation against data loss once acknowledged. In some embodiments, the system incorporates an enhanced arbiter role the enables the arbiter to participate in cluster-wide commitment of data. In other embodiments, the enhanced arbiter role enables secondary nodes to evaluate arbiter operations logs when determining election criteria for new primary nodes.

21 Claims, 11 Drawing Sheets

(56) References Cited

U.S. PATENT DOCUMENTS

| | | |
|---|---|---|
| 5,598,559 A | 1/1997 | Chaudhuri |
| 5,710,915 A | 1/1998 | McElhiney |
| 5,884,299 A | 3/1999 | Ramesh et al. |
| 5,999,179 A | 12/1999 | Kekic et al. |
| 6,065,017 A | 5/2000 | Barker |
| 6,088,524 A | 7/2000 | Levy et al. |
| 6,112,201 A | 8/2000 | Wical |
| 6,115,705 A | 9/2000 | Larson |
| 6,240,406 B1 | 5/2001 | Tannen |
| 6,240,514 B1 | 5/2001 | Inoue et al. |
| 6,249,866 B1 | 6/2001 | Brundett et al. |
| 6,324,540 B1 | 11/2001 | Khanna et al. |
| 6,324,654 B1 | 11/2001 | Wahl et al. |
| 6,339,770 B1 | 1/2002 | Leung et al. |
| 6,351,742 B1 | 2/2002 | Agarwal et al. |
| 6,363,389 B1 | 3/2002 | Lyle et al. |
| 6,385,201 B1 | 5/2002 | Iwata |
| 6,385,604 B1 | 5/2002 | Bakalash et al. |
| 6,496,843 B1 | 12/2002 | Getchius et al. |
| 6,505,187 B1 | 1/2003 | Shatdal |
| 6,611,850 B1 | 8/2003 | Shen |
| 6,687,846 B1 | 2/2004 | Adrangi et al. |
| 6,691,101 B2 | 2/2004 | MacNicol et al. |
| 6,801,905 B2 | 10/2004 | Andrei |
| 6,823,474 B2 | 11/2004 | Kampe et al. |
| 6,920,460 B1 | 7/2005 | Srinivasan et al. |
| 6,959,369 B1 | 10/2005 | Ashton et al. |
| 7,020,649 B2 | 3/2006 | Cochrane et al. |
| 7,032,089 B1 | 4/2006 | Ranade et al. |
| 7,082,473 B2 | 7/2006 | Breitbart et al. |
| 7,177,866 B2 | 2/2007 | Holenstein et al. |
| 7,181,460 B2 | 2/2007 | Coss et al. |
| 7,191,299 B1 | 3/2007 | Kekre et al. |
| 7,246,345 B1 | 7/2007 | Sharma et al. |
| 7,447,807 B1 | 11/2008 | Merry et al. |
| 7,467,103 B1 | 12/2008 | Murray et al. |
| 7,469,253 B2 | 12/2008 | Celis et al. |
| 7,472,117 B2 | 12/2008 | Dettinger et al. |
| 7,486,661 B2 | 2/2009 | Van den Boeck et al. |
| 7,548,928 B1 | 6/2009 | Dean et al. |
| 7,552,356 B1 | 6/2009 | Waterhouse et al. |
| 7,558,481 B2 | 7/2009 | Jenkins et al. |
| 7,567,991 B2 | 7/2009 | Armangau et al. |
| 7,617,369 B1 | 11/2009 | Bezbaruah et al. |
| 7,634,459 B1 | 12/2009 | Eshet et al. |
| 7,647,329 B1 | 1/2010 | Fischman et al. |
| 7,657,570 B2 | 2/2010 | Wang et al. |
| 7,657,578 B1 | 2/2010 | Karr et al. |
| 7,668,801 B1 | 2/2010 | Koudas et al. |
| 7,761,465 B1 | 7/2010 | Nonaka et al. |
| 7,957,284 B2 | 6/2011 | Lu et al. |
| 7,962,458 B2 | 6/2011 | Holenstein et al. |
| 8,005,804 B2 | 8/2011 | Greer |
| 8,005,868 B2 | 8/2011 | Saborit et al. |
| 8,037,059 B2 | 10/2011 | Bestgen et al. |
| 8,078,825 B2 | 12/2011 | Oreland et al. |
| 8,082,265 B2 | 12/2011 | Carlson et al. |
| 8,086,597 B2 | 12/2011 | Balmin et al. |
| 8,099,572 B1 | 1/2012 | Arora et al. |
| 8,103,906 B1 | 1/2012 | Alibakhs et al. |
| 8,108,443 B2 | 1/2012 | Thusoo |
| 8,126,848 B2 | 2/2012 | Wagner |
| 8,170,984 B2 | 5/2012 | Bakalash et al. |
| 8,260,840 B1 | 9/2012 | Sirota et al. |
| 8,296,419 B1 | 10/2012 | Khanna et al. |
| 8,305,999 B2 | 11/2012 | Palanki et al. |
| 8,321,558 B1 | 11/2012 | Sirota et al. |
| 8,352,450 B1 | 1/2013 | Mraz et al. |
| 8,352,463 B2 | 1/2013 | Nayak |
| 8,363,961 B1 | 1/2013 | Avidan et al. |
| 8,370,857 B2 | 2/2013 | Kamii et al. |
| 8,386,463 B2 | 2/2013 | Bestgen et al. |
| 8,392,482 B1 | 3/2013 | McAlister et al. |
| 8,539,197 B1 | 9/2013 | Marshall et al. |
| 8,572,031 B2 | 10/2013 | Merriman et al. |
| 8,589,382 B2 | 11/2013 | Betawadkar-Norwood |
| 8,589,574 B1 | 11/2013 | Cormie et al. |
| 8,615,507 B2 | 12/2013 | Varadarajulu et al. |
| 8,712,044 B2 | 4/2014 | MacMillan et al. |
| 8,712,993 B1 | 4/2014 | Ordonez |
| 8,751,533 B1 | 6/2014 | Dhavale et al. |
| 8,843,441 B1 | 9/2014 | Rath et al. |
| 8,869,256 B2 | 10/2014 | Sample |
| 8,996,463 B2 | 3/2015 | Merriman et al. |
| 9,015,431 B2 | 4/2015 | Resch et al. |
| 9,069,827 B1 | 6/2015 | Rath et al. |
| 9,116,862 B1 | 8/2015 | Rath et al. |
| 9,141,814 B1 | 9/2015 | Murray |
| 9,183,254 B1 | 11/2015 | Cole et al. |
| 9,262,462 B2 | 2/2016 | Merriman et al. |
| 9,268,639 B2 | 2/2016 | Leggette et al. |
| 9,274,902 B1 | 3/2016 | Morley et al. |
| 9,317,576 B2 | 4/2016 | Merriman et al. |
| 9,350,633 B2 | 5/2016 | Cudak et al. |
| 9,350,681 B1 | 5/2016 | Kitagawa et al. |
| 9,460,008 B1 | 10/2016 | Leshinsky et al. |
| 9,495,427 B2 | 11/2016 | Abadi et al. |
| 9,569,481 B1 | 2/2017 | Chandra et al. |
| 9,660,666 B1 | 5/2017 | Ciarlini et al. |
| 9,740,762 B2 | 8/2017 | Horowitz et al. |
| 9,792,322 B2 | 10/2017 | Merriman et al. |
| 9,805,108 B2 | 10/2017 | Merriman et al. |
| 9,881,034 B2 | 1/2018 | Horowitz et al. |
| 9,959,308 B1 | 5/2018 | Carman et al. |
| 10,031,931 B2 | 7/2018 | Horowitz et al. |
| 10,031,956 B2 | 7/2018 | Merriman et al. |
| 10,262,050 B2 | 4/2019 | Bostic et al. |
| 10,346,430 B2 | 7/2019 | Horowitz et al. |
| 10,346,434 B1 | 7/2019 | Morkel et al. |
| 10,366,100 B2 | 7/2019 | Horowitz et al. |
| 10,372,926 B1 | 8/2019 | Leshinsky et al. |
| 10,394,822 B2 | 8/2019 | Stearn |
| 10,423,626 B2 | 9/2019 | Stearn et al. |
| 10,430,433 B2 | 10/2019 | Stearn et al. |
| 10,489,357 B2 | 11/2019 | Horowitz et al. |
| 10,496,669 B2 | 12/2019 | Merriman et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0184239 A1 | 12/2002 | Mosher, Jr. et al. |
| 2003/0046307 A1 | 3/2003 | Rivette et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1* | 7/2004 | Holenstein .......... G06F 11/2064 |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0288232 A1 | 12/2006 | Ho et al. |
| 2006/0294129 A1 | 12/2006 | Stanfill et al. |
| 2007/0050436 A1 | 3/2007 | Chen et al. |

(56) References Cited

U.S. PATENT DOCUMENTS

| | | |
|---|---|---|
| 2007/0061487 A1 | 3/2007 | Moore et al. |
| 2007/0094237 A1 | 4/2007 | Mitchell et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0016021 A1 | 1/2008 | Gulbeden et al. |
| 2008/0071755 A1 | 3/2008 | Barsness et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250930 A1 | 9/2010 | Csaszar et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0109892 A1 | 5/2012 | Novik et al. |
| 2012/0109935 A1 | 5/2012 | Meijer |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0198200 A1 | 8/2012 | Li et al. |
| 2012/0221540 A1 | 8/2012 | Rose et al. |
| 2012/0254175 A1 | 10/2012 | Horowitz |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Suparna et al. |
| 2016/0005423 A1 | 1/2016 | Neppalli et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162374 A1 | 6/2016 | Mutha et al. |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Steam et al. |
| 2017/0109421 A1 | 4/2017 | Steam et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |

OTHER PUBLICATIONS

Cooper et al., PNUTS: Yahoo!'s hosted data serving platform. VLDB Endowment. Aug. 2008.

Decandia et al., Dynamo: Amazon's highly available key-value store. SOSP 2007. Oct. 2004.

Van Renesse et al., Chain replication for supporting high throughput and availability. OSDI. 2004: 91-104.

Wilkins et al., Migrate DB2 applications to a partitioned database. developerWorks, IBM. Apr. 24, 2008, 33 pages.

[No Author Listed], Automated Administration Tasks (SQL Server Agent). https://docs.microsoft.com/en-us/sql/ssms/agent/automated-adminsitration-tasks-sql-server-agent. 2 pages. [downloaded Mar. 4, 2017].

(56) References Cited

OTHER PUBLICATIONS

Nelson et al., Automate MongoDB with MMS. PowerPoint Presentation. Published Jul. 24, 2014. 27 slides. http://www.slideshare.net/mongodb/mms-automation-mongo-db-world.
Poder, Oracle living books. 2009. <http://tech.e2sn.com/oracle/sql/oracle-execution-plan-operation-reference >.
Stirman, Run MongoDB with Confidence using MMS. PowerPoint Presentation. Published Oct. 6, 2014. 34 slides. http://www.slideshare.net/mongodb/mongo-db-boston-run-mongodb-with-mms-20141001.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.

\* cited by examiner

```
write()          //process any type write request modify, delete
{                //add data
parse client<input>    //any client request
identify()<write>
route() primary  //capture cfg info for current primary
execute<write>         //primary executes write
log() operation        //primary updates log
distribute() operation
    { route operation to secondaries
    [arbiter oplog enabled] route to arbiters else continue
    //test arbiter or oplog config
    [safe write]    //test write for safe param
        { verify receipt    //wait for ack or query
                            //recipients
    if receipt = true increment opcount
    test opcount > threshold
    if true acknowledge safe write end loop
    if false repeat loop
}
```

FIG. 7A

```
monitor()
{[test] <heartbeat signal>
    if status = error call elect()
    else wait (period)
} elect()
{ check replication status        //make sure no errors
    if rep.status = valid then vote (self)           //1st node votes
    else if rep.status = rec'd vote then vote(#)  //w/out comparison
                                            //vote (#) specified by db config
    if rep.status = error wait     //if error wait for vote from
                                   //another node
} vote()
{
    test<vote.information>       //sys cfg settings dictate options
                                 //options can be additive, alternative or combined (Case 1)  data time stamp   //test node for freshest data
              check local.data time stamp
              if GTE vote.data time stamp then vote(self)
              else if check arbiter.data time stamp  //is arbiter oplog better?
                   if GTE vote.data time stamp then vote (self)
                   else confirm<received vote>   //join consensus group
                        with node.id              //add current node ID to vote (Case 2)  data time stamp ; location ;
              //test(1) plus location info for best primary candidate
              ...code from (1)  //optional test 1 + 2
              check vote.location
                   if local.location>vote.location then vote (self)
                   //test dist to fail primary - closest has greater value (cont'd)
```

*FIG. 7B*

```
(cont'd)
    (Case 3) uptime
        check local.uptime
        if GTE vote.uptime then vote(self)
        //...code from 1
        //...code from 2
        //optimally test 1, 3 ; 1, 2, +3 ; 1 + 3 depending
        //on config settings (Case 4) hardware
        check local.hardware val
        if GTE vote.hardware val then vote(self)
        //hardware value determined by computational capacity
        //greater resources (e.g., memory, disk, CPU, etc.) greatest val
        //option...code from (1)
        //        code from (2)
        //        code from (3)
        //optionally test 1, 4 ; 2, 4 ; 3, 4 ; 1, 2, 4 ; 1, 3, 4...any combo of
            //options
    ...
    (Case self)

```
(cont'd)
(Case self)
capture vote.information        //capture vote info
    set vote.data time stamp = local.data time stamp
    set vote.location = local.location
    set vote.uptime = local.uptime
    set vote.hardware val = local.hardware val
    ...
broadcast vote                  //send vote + info to secondary nodes +
                                //        arbiters
(Case arbiter)
    eval received rates         //execute eval criteria 1, 2, 3, and/or
    confirm best vote           //                    4
                                //
(*) end
}
```

FIG. 7D

SYSTEM AND METHOD FOR AUGMENTING CONSENSUS ELECTION IN A DISTRIBUTED DATABASE

RELATED APPLICATIONS

This application claims priority under 35 U.S.C. § 119(e) to U.S. Provisional Application Ser. No. 62/188,097 entitled "SYSTEM AND METHOD FOR AUGMENTING CONSENSUS ELECTION IN A DISTRIBUTED DATABASE," filed on Jul. 2, 2015, which application is incorporated herein by reference in its entirety.

BACKGROUND

Conventional distributed databases have become sophisticated in their architectures, and many have the ability to be customized to a variety of performance guarantees. Distributed databases executing eventual consistency models can be specifically tailored to achieve any number of durability guarantees. For instance, some distributed databases can be customized to target high durability of data writes, or to target low latency of writes, among other examples.

In some conventional systems, different architectures can be implemented to support automatic failover of master or primary nodes (i.e., nodes responsible for processing write operations) without loss of any committed data. One example approach is described in U.S. Pat. No. 8,572,031 incorporated by reference herein. Under that approach, primary nodes are elected to handle operations received from database clients, and replicate the operations to secondary nodes. To facilitate assignment of a primary node, a distributed database may include arbiter nodes that facilitate a consensus-based election of primary nodes between the primary and secondary nodes of the distributed database. As described in U.S. Pat. No. 8,572,031, the arbiter nodes can be configured to operate as observers of primary election, and further to participate in a primary election process to the extent of confirming a vote for a primary or a secondary node within the distributed database.

SUMMARY

Under conventional configurations of eventually consistent distributed databases, one or more sets of nodes can be responsible for receiving, executing, and replicating write operations throughout the distributed database. In such databases, various roles can be assigned to each node. For example, primary nodes can receive and execute write operations from database clients, and secondary nodes replicate the data hosted on the primary, replicate execution of the write operations on the primary, and elect primary nodes as necessary. In further examples, a distributed database can include arbiter nodes, which do not host data, but are configured to participate in elections of new primaries when they occur. Generally, conventional arbiter nodes do not participate in commitment operations for data within the distributed database.

According to one aspect, it is realized the conventional observer or arbiter nodes can be enhanced to facilitate cluster-wide commitment operations for data. For example, where sets of nodes are responsible for receiving, executing, and replicating write operations throughout the distributed database, arbiter nodes can be configured to maintain copies of the replicated operation log. In one example, by implementing the copy of the operation log on the arbiter node, the number of nodes that can respond to a consensus-based commit is increased. In some embodiments, arbiter operations can reduce database latency for data commitment. In other embodiments, the reduction in latency can be achieved with minimal overhead, for example, by implementing copies of the operation log on arbiter nodes within the distributed database.

In other embodiments, implementing enhanced arbiter nodes reduces the need for expensive hardware. For example, an enhanced arbiter node can replace a secondary node in a replica set. The hardware requirements for an enhanced arbiter is significantly less than the hardware required for a true secondary node (e.g., by virtue of hosting database date). Thus, the system requirements, computational complexity, and expense of implementing a distributed database supported by replica sets is reduced. In one example, the enhanced arbiters are configured to support the ordinary functions of the replica set (e.g., replication, data commitment, and primary election), and do so without the need of hosting additional database copies. In other aspects, enhanced arbiters enable a minimal replica set environment of one primary, one secondary, and one arbiter while still implementing majority based protocols (e.g., primary election and data commitment, among other options).

In further aspects, the arbiter role is defined such that the node having the arbiter role can also be configured to enhance a consensus-based election of a primary node. For example, consensus election can be based on freshest date for a node's data. For instance, the distributed database can be configured to promote a secondary node having the freshest data in response to failure of a primary node. According to one embodiment, the arbiter's operation log can be used to make an out of date secondary node electable.

In one implementation, the arbiter's operation log represents a window of operations that can be replayed to any secondary node. In some examples, the election process can be configured to take into account the ability to use the arbiter operation log to bring any secondary node as up to date as the last operation in the arbiter operation log. Thus, the operations from the arbiter copy of the operation log can bring the out of date secondary node current, and make any out of date secondary node a viable candidate for primary election.

According to one embodiment, a node can be defined in a distributed database with an arbiter or observer role that facilitates commitment operations and can also improve execution of primary election functions. As discussed, in conventional implementations arbiter or observer nodes do not participate in data commitment and serve a limited role in electing primary nodes. One example of a commitment requirement includes a replication rule that more than half of the nodes responsible for a given portion of data must receive the replication operation prior to commitment. Once more than half of the nodes responsible for the data have received the replicated operation, the durability of the operation is assured. Enhanced arbiters, which can include copies of the replicated operation log, can participate in cluster-wide commitment like secondary nodes, even in examples where the arbiter node does not host a copy of the distributed data. Upon receiving a replicated operation entry from a primary node, the arbiter can report receipt and any count towards the majority requirement can be increased accordingly based on the receipt by the arbiter of the replication operation. In some embodiments, implementing enhanced arbiter roles can decrease the time required for commitment to write operations, reducing latency and improving the operation of the database system. Further, enhancing arbiter roles in a distributed database improves durability of operations with little overhead and thus increases the efficiency of the database system.

According to one aspect, a computer implemented method for managing a distributed database is provided. The method comprises establishing at least one primary node within a plurality of nodes, wherein the plurality of nodes comprise the distributed database system and the distributed database system provides responses to database requests from database clients, restricting processing of write operations received from the database clients to the at least one primary node, establishing at least one secondary node configured to host a replica of the primary node database from the plurality of nodes, establishing at least one arbiter node configured to host an operation log of operations executed by the primary node, replicating from the primary node at least one log entry reflecting the write operations executed by the primary node to the at least one secondary node and the at least one arbiter node, and confirming a safe write operation received from a database client in response to determining that the safe write operation has been executed at a threshold number of the plurality of nodes responsible for the associated data, wherein determining that the safe write operation has been executed at the threshold number includes an act of: determining from the nodes responsible for the associated data including the at least one arbiter and the at least one secondary node, that the threshold number of nodes has entered the log entry reflecting the write operation into a respective operation log or has executed the write operation on a respective replica of the primary node database.

According to one embodiment, the threshold number of the plurality of nodes is determined by reaching a majority of the number of nodes making up the at least one primary, the at least one secondary node, and the at least one arbiter node. According to one embodiment, the safe write operation includes any one or more members of a group of a data modification request, an update request, a data creation request, and a data deletion request.

According to one embodiment, the act of establishing the at least one arbiter node includes defining an arbiter role restricting arbiter nodes from servicing database client requests (e.g., read requests). According to one embodiment, the act of establishing the at least one arbiter node includes defining an arbiter role restricting arbiter nodes from hosting a replica of the primary node database. According to one embodiment, the method further comprises identifying missing operations by at least one of the secondary nodes. According to one embodiment, the method further comprises querying by the at least one of the secondary nodes the at least one arbiter node to determine the missing operations is available from the arbiter's operations log.

According to one embodiment, the method further comprises communicating at least one log entry associated with the missing operation from the arbiter's operation log to the at least one secondary node, and executing the missing operation at the at least one secondary node. According to one embodiment, the method further comprises an act of electing a new primary node from the plurality of secondary nodes, wherein the plurality of secondary nodes are configured to analyze the operation log of the at least one arbiter to determine eligibility to be elected the new primary node. According to one embodiment, the act of replicating occurs asynchronously as a default mode, and wherein the act of replicating is confirmed responsive to a safe write request.

According to one aspect, a distributed database system is provided. The system comprises at least one processor operatively connected to a memory, the at least one processor when running is configured to execute a plurality of system components, wherein the plurality of system components comprise: a configuration component configured to establish a role associated with each node in a plurality of nodes, wherein the role component is configured to establish at least one primary node with a primary role, at least a plurality of secondary nodes with a secondary role, and at least one arbiter node with an arbiter role, a replication component configured to restrict write operations received from client computer systems to the at least one primary node having the primary role, the at least one primary node configured to: execute write operations on a respective copy of at least a portion of the database data and generate a log entry for execution of the operation, replicate the log entry to the plurality of secondary nodes and the at least one arbiter node, the plurality of secondary nodes configured to: host a copy of data hosted by the at least one primary node, execute the log entry received from the primary node to update a respective copy of the data, the at least one arbiter node configured to update an operation log of operations performed by the at least one primary node, wherein the replication component is further configured to acknowledge a safe write operation responsive to determining that operation has been executed, replicated, or logged by a threshold number of the nodes responsible for the data associated with the safe write operation.

According to one embodiment, wherein the threshold number of the plurality of nodes is determined by upon reaching a majority of the number of nodes making up the at least one primary, the at least one secondary node, and the at least one arbiter node responsible for target data of the safe write operation. According to one embodiment, the safe write operation includes any one or more members of a group including a data modification request, an update request, a data creation request, and a data deletion request. According to one embodiment, the configuration component is further configured to establish the arbiter role to restrict arbiter nodes from servicing database client requests (e.g., read requests). According to one embodiment, the configuration component is further configured to establish the arbiter role to restrict arbiter nodes from hosting a replica of the primary node database.

According to one embodiment, the replication component is further configured to identify missing operations on at least one of the secondary nodes responsive to receipt of the at least one log entry reflecting the write operations executed by the primary node. According to one embodiment, the at least one of the secondary nodes is configured to execute missing operations received from an arbiter operation log. According to one embodiment, the replication component is further configured to query the at least one arbiter node to determine that the missing operations is available from the arbiter's operations log. According to one embodiment, the replication component is further configured to trigger communication of the at least one log entry associated with the missing operation from the arbiter's operation log to the at least one secondary node.

According to one aspect, a computer implemented method for managing a distributed database is provided. The method comprises establishing at least one primary node within a plurality of nodes, wherein the plurality of nodes comprise the distributed database system and the distributed database system provides responses to database requests from database clients, restricting processing of write operations received from the database clients to the at least one primary node, establishing at least one secondary node configured to host a replica of the primary node database from the plurality of nodes and update the replica responsive to received replicated operations from the at least one primary node, establishing at least one arbiter node configured to host an operation log of operations executed by the primary node, and electing a new primary responsive to detecting a failure of the at least one primary node, wherein electing the new primary node includes: executing a consensus protocol between the at least one secondary node and the at least one arbiter node associated with the failed at least one primary node, evaluating election criteria at the at least one secondary node during an election period, communicating by a respective one of the at least one secondary node a self-vote responsive to determining the respective one of the at least one secondary node meets the election criteria, or communicating a confirmation of a received vote of another secondary node responsive to determining the another secondary node has better election criteria, and evaluating by the respective one of the at least one secondary node the operation log of the at least one arbiter node to determine election criteria associated with most recent data as part of the determining the another secondary node has better election criteria or determining the respective one of the at least one secondary node meets the election criteria.

According to one embodiment, the method further comprises an act of communicating a self-vote responsive to querying the at least one arbiter's operation log and determining that the at least one arbiter's operation log includes operation as recent or more recent then received election information.

According to one embodiment, the election criteria include at least one of, or any combination of, or two or three or more of: a most recent data requirement, a location requirement, a hardware requirement, and an uptime requirement. According to one embodiment, responsive to the respective one of the at least one secondary node determining the at least one arbiter's operation log includes the most data, triggering an update of the respective one of the at least one secondary node's replica of the primary database. According to one embodiment, the method further comprises an act of committing write operations responsive to safe write requests received from database clients, wherein committing the write operations includes counting logging the write operation at the at least one arbiter towards any commitment requirements.

According to one aspect, a distributed database system is provided. The system comprises at least one processor operatively connected to a memory, the at least one processor when running is configured to execute a plurality of system components, wherein the plurality of system components comprise: a configuration component configured to establish a role associated with each node in a plurality of nodes, wherein the role component is configured to establish at least one primary node with a primary role, at least one secondary node with a secondary role, and at least one arbiter node with an arbiter role, a replication component configured to restrict write operations received from client computer systems to the at least one primary node having the primary role, the at least one primary node configured to: execute write operations on a respective copy of at least a portion of the database data and generate a log entry for execution of the operation, replicate the log entry to the at least one secondary node and the at least one arbiter node, the at least one secondary node configured to: host a copy of data hosted by the at least one primary node, execute the log entry received from the primary node to update a respective copy of the data, the at least one arbiter node configured to update an operation log of operations performed by the at least one primary node, an election component configured to elect a new primary responsive to detecting a failure of the at least one primary node, wherein the election component is further configured to execute a consensus protocol between the at least one secondary node and the at least one arbiter associated with the failed at least one primary node, evaluate election criteria at the at least one secondary node during an election period, communicate a self-vote for a respective one of the at least one secondary node responsive to determining the respective one of the at least one secondary node meets the election criteria, or communicate a confirmation of a received vote of another secondary node responsive to determining the another secondary node has better election criteria; and evaluate the operation log of the at least one arbiter node to determine election criteria associated with most recent data as part of the determining the another secondary node has better election criteria or determining the respective one of the at least one secondary node meets the election criteria.

According to one embodiment, the election component is distributed through at least some of the nodes comprising the distribute database. According to one embodiment, the election component is distributed at least through at least one secondary node and the at least one arbiter node.

According to one aspect, a computer implemented method for electing a primary node in a distributed database is provided. The method comprises electing a new primary responsive to detecting a failure of the at least one primary node, wherein electing the new primary node includes executing a consensus protocol between the at least one secondary node and the at least one arbiter associated with the failed at least one primary node, evaluating election criteria at the at least one secondary node during an election period, communicating by a respective one of the at least one secondary node a self-vote responsive to determining the respective one of the at least one secondary node meets the election criteria or communicating a confirmation of a received vote of another secondary node responsive to determining the another secondary node has better election criteria; and evaluating by the respective one of the at least one secondary node the operation log of the at least one arbiter node to determine election criteria associated with most recent data as part of the determining the another secondary node has better election criteria or determining the respective one of the at least one secondary node meets the election criteria. According to one embodiment, the method further comprises any one or more of the preceding methods or method elements.

According to one aspect, a distributed database system is provided. The system comprises at least one processor operatively connected to a memory, the at least one processor when running is configured to execute a plurality of system components, wherein the plurality of system components comprise: an election component configured to elect a new primary responsive to detecting a failure of the at least one primary node, wherein the election component is further configured to: execute a consensus protocol between the at least one secondary node and the at least one arbiter associated with the failed at least one primary node, evaluate election criteria at the at least one secondary node during an election period, communicate a self-vote for a respective one of the at least one secondary node responsive to determining the respective one of the at least one secondary node meets the election criteria or communicate a confirmation of a received vote of another secondary node responsive to determining the another secondary node has better election criteria, and evaluate the operation log of the at least one arbiter node to determine election criteria associated with most recent data as part of the determining the another secondary node has better election criteria or determining the respective one of the at least one secondary node meets the election criteria. According to one embodiment, the system further comprises any one or more or any combination of the preceding system embodiments or system elements.

According to one aspect, a distributed database system is provided. The system comprises at least one primary node configured execute write operations from database clients and replicate a log entry associated with the write operation to a at least one secondary node and at least one arbiter node, at least one processor operatively connected to a memory, the at least one processor when running is configured to execute a plurality of system components, wherein the plurality of system components comprise a replication component configured to restrict write operations received from the database client to the at least one primary node having a primary role, the at least one arbiter node configured to update an operation log of operations performed by the at least one primary node, wherein the replication component is further configured to acknowledge a safe write operation responsive to determining that operation has been executed, replicated, or logged by a threshold number of the nodes from the at least one arbiter node and the at least one secondary node responsible for the data associated with the safe write operation. According to one embodiment, the system further comprises any one or more or any combination of system embodiments or system elements.

According to one aspect, a computer implemented method for managing a distributed database is provided. The method comprises replicating from a primary node at least one log entry reflecting write operations executed by the primary node to at least one secondary node and at least one arbiter node; and confirming a safe write operation received from a database client in response to determining that the safe write operation has been executed at a threshold number of the plurality of nodes hosting the associated data or an operation log, wherein determining that the safe write operation has been executed at the threshold number includes: determining that operation has been executed, replicated, or logged by a threshold number of the nodes of the at least one arbiter node and the at least one secondary node responsible for the data associated with the safe write operation.

According to one embodiment, the method includes establishing a primary node configured host a copy of database data, execute write operations, maintain an operation log and replicate executed operations to secondary nodes and arbiter nodes. According to one embodiment, the method includes establishing a secondary node configured host a copy of database data, execute replicated write operations, maintain an operation log. According to one embodiment, the method includes establishing an arbiter node configured to maintain an operation log based on received replication operations from the primary. In another embodiment, the arbiter node does not host a client accessible copy of the database data.

According to one embodiment, determining that operation has been executed, replicated, or logged includes, acts of: determining that the at least one arbiter node has entered the log entry reflecting the write operation into a respective operation log, and determining that at least one of the at least one secondary node has executed the write operation on a respective replica of the primary node database or entered the log entry reflecting the write operation into a respective operation log. According to one embodiment, the method further comprises any one or more or any combination of the preceding methods or individual method elements from any one or more the preceding methods.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIGS. 7A-D illustrate example pseudo-code that can be executed by the system, replication engine, and/or any system component in whole or in part, according to some embodiments.

DETAILED DESCRIPTION

Figure 1:
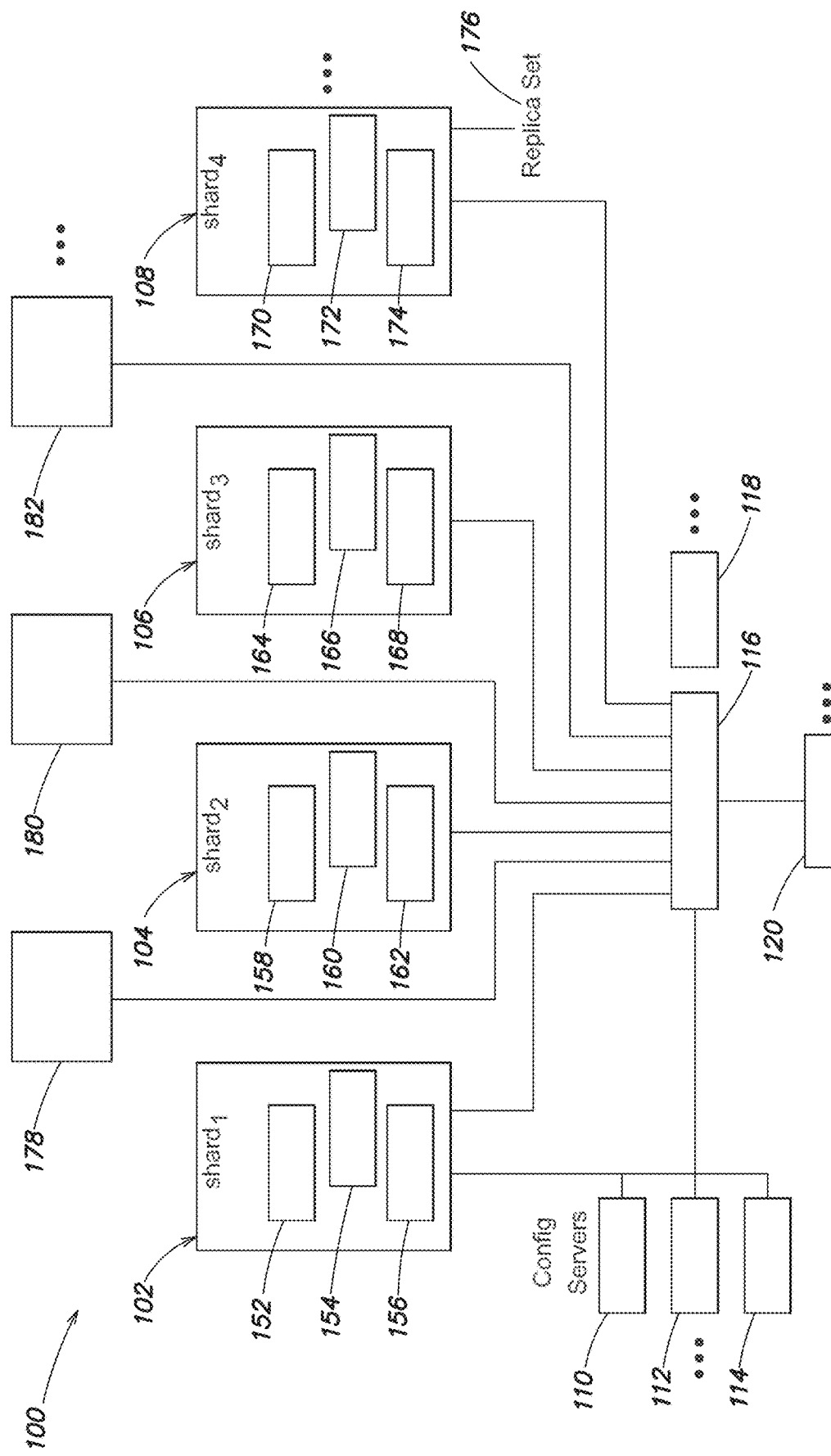
FIG. 1 illustrates a block diagram of an example architecture for a distributed database system, according to one embodiment.

According to one aspect, a distributed database system can be enhanced via operation of arbiter nodes. Unlike conventional systems, the arbiter nodes can be modified to participate in data commitment operations, resulting in reduced latency and increased durability of write operations. According to one embodiment, the arbiter role can be defined for the distributed database such that the arbiter node does not operate as and cannot be elected to a primary role, but can augment data commitment and/or consensus election protocols.

According to one aspect, a primary node with the primary role handles write operations received from database clients and distributes write operations executed on the primary node's copy of the data to secondary nodes hosting respective copies of the data. The secondary nodes receive logged operations form the primary and execute the logged operations on their respective copies of the distributed data. Under the enhanced arbiter role, arbiter nodes in the distributed database also receive logged operations from the primary node. According to one embodiment, the arbiter nodes maintain logged operations for a period of time, for example, specified by database configuration files. As the period of time is exceeded, the oldest logged operations can be deleted, archived, or imaged and new operations added to the arbiter's operation log. In some examples, the arbiter's operation log is configured to maintain a rolling window of operations that can be accessed by the system and executed to update any secondary node.

According to one embodiment, primary nodes can be assigned at initiation of a distributed database, and in other embodiments can also be initially elected from a pool of secondary nodes. In some examples, a distributed database system defines an arbiter role such that the arbiter node cannot be elected as a primary node, but can participate in electing a primary node. In further examples, the arbiter's operation log can be used in evaluating which secondary nodes are electable to be primary. In one example, the availability of the arbiter's operation log can be evaluated by the distributed database (and, for example, secondary nodes), and used to determine if the secondary node as updated by the arbiter operation log would be the best candidate for election. In some embodiments, the arbiter role is defined on the system such that arbiters do not host client accessible copies of the database data (e.g., arbiters are not configured to respond to client requests for data), or are not configured for responding to client request. In one example, arbiter nodes are specially configured to operate as observers of the database operations for client requests on data (e.g., logging operations only, facilitating consensus elections, etc.). In another example, the arbiter node role is configured so that an arbiter cannot operate as a secondary node and further cannot be elected as a primary node.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 illustrates a block diagram of an example architecture 100 for a distributed database system that provides at least eventual consistency in the database data via replication of write operations to other nodes hosting the same data. The distributed database system 100 is further configured to include one or more arbiter nodes having an arbiter role (e.g., 178, 180, and 182).

In some embodiments of the distributed database system, enhanced arbiter processing requires a configuration permitting or enabling arbiter participation in operation log execution. The operation log setting can be enabled for all arbiter nodes across an entire database, or can be enabled for groupings of arbiter nodes within the database (e.g., logical groupings of data, partitions of data, for specific nodes, groups of nodes, etc.), in further examples, arbiters can be configured individually to participate in capturing and storing operation log information. In various embodiments, once enabled the participation of the arbiter nodes in data commitment and/or consensus election protocols improves the operation of conventional database systems, for example, through increased durability of database data, reduced latency in commitment operations, and increased resource utilization across the distributed database, among other examples.

According to one embodiment, an arbiter node can participate in safe write operations on the distributed database. Safe write operations can be requested by database clients such that once the write operations is acknowledged by the database system the operation/data will not be lost. In some examples, the distributed database system is configured to acknowledge safe write operations only in response to a threshold number of systems executing the operation. Based on participation of the arbiter nodes via copying the operation to a respective operation log, the threshold number can be greater, can be reached faster, and can increase utilization of database resources, the execution of any of which improves the database system over conventional approaches. In further embodiments, the distributed database can include a default mode of operation whereby writes are replicated asynchronously and are not acknowledged, unless a safe write request is made to the database.

In one example, the distributed database 100 can be architected to implement database shards. Sharding refers to the process of separating the database into partitions and each partition can be referred to as a "chunk." Conventional databases such as network-based, file-based, entity-based, relational, and object oriented databases, among other types, can be configured to operate within a sharded environment and each can benefit from the implementation of the enhanced arbiter role with or without sharding. In various embodiments, enhanced arbiter nodes can be implemented with any other types of databases, database organization, hybrid and/or database management systems thereby reducing complexity in reconciliation and/or ordering operations, and thereby improving the performance of the database system.

As discussed, the distributed database system 100 can be specially configured as a sharded cluster including enhanced arbiter nodes. A sharded cluster is the grouping of shards that collectively represent the data within the database A sharded cluster typically comprises multiple servers (e.g., 102-108) hosting multiple chunks (e.g., 152-174). Chunks establish non-overlapping partitions of data wherein a designated field known as a "shard key" present in all datum composing the data defines a range of values from some minimum value to some maximum value. The arbitrary collection of chunks residing on any given node at any given time are collectively referred to as a shard. In further embodiments, the distributed database can include a balancer configured to migrate chunks from shard to shard in response to data growth. According to one embodiment, the cluster can also include one or more configuration servers (e.g., 110-114) for metadata management, and operation routing processes (e.g., 116-118). Metadata for the sharded cluster can include, for example, information on the ranges of data stored in each partition, information associated with managing the sharded cluster, partition counts, number of shard servers, data index information, partition size constraints, data distribution thresholds, among other options.

According to some embodiments, the metadata for the sharded clusters includes information on whether the database permits participation of arbiter nodes in data commitment and/or consensus election protocols. In other embodiments, arbiter participation can be specified at data handling nodes of the distributed database (e.g., primary or secondary nodes), and/or where configurations specify what nodes are responsible for hosting data. In some examples, the distributed database system is configured to accept and enforce configuration settings that enable or disable arbiter participation in data commitment and/or election protocols for a database, a group of database nodes, subsets of the database, logical groupings of the data within the database, etc. In one example, the setting can be stored as configuration metadata.

Each chunk of data (e.g., 152-174) can be configured to reside on one or more servers executing database operations for storing, retrieving, managing, and/or updating data. Each chunk can be hosted as multiple copies of the data hosted on multiple systems. In one example, each chunk of data (e.g., 152-174) can be hosted by a replica set (e.g., a group of systems with copies of respective database data). In other embodiments, one replica set can host multiple chunks of data.

Configurations within a sharded cluster can be defined by metadata associated with the managed database and can be referred to as shard metadata. Shard metadata can include information on collections within a given database, the number of collections, data associated with accessing the collections, database key properties for a given collection, ranges of key values associated with a given partition and/or shard within a given collection, systems hosting copies of the same data, specification of nodes and roles (e.g., primary, secondary, arbiter, etc.) to provide some examples.

Shard metadata can also include information on whether arbiter participation in data commitment and/or election protocols is permitted. In some embodiments, the shard metadata can be managed dynamically to include information on a last write operation, processed or received. The information on the last write operation can be used in selecting a node in the database to handle subsequent or even simultaneous write operations to the database.

According to one embodiment, underlying a sharded cluster is a set of nodes that maintains multiple copies of the sharded data, for example, copies of the chunks of data. According to one aspect, the set of nodes can be configured as a replica set, as described in in U.S. Pat. No. 8,572,031 incorporated herein by reference in its entirety. Each replica set is made up a number of nodes include at least a primary node which maintains a primary copy of the data and a secondary node which receives replicated operations from the primary. More generally, a node in the distributed database is any processing entity that is responsible for a portion of the database data or management functions associated with the database data. In one example, a node can include a database instance executing on a stand-alone server. In other examples, a node can host multiple database instances Various implementations of sharded databases may incorporate replica sets and are discussed with respect to co-pending U.S. Patent Application Publication 2012-0254175, incorporated herein by reference in its entirety. The sharded databases discussed may be modified to include enhanced arbiter configurations (e.g., arbiters configured to participate in data commitment, arbiters configured to participate in secondary updating for election, and various combinations thereof) and utilize the various aspects and embodiments discussed herein.

Returning to FIG. 1, the three dots illustrated next to the system components indicate that the system component can be repeated. In some embodiments, adding additional shards, configuration servers, copies of partitions, and/or shard routing processes can increase the capacity of the distributed database system. The operation router processes 116-118 handle incoming requests from clients 120 (e.g., applications, web services, user initiated requests, application protocol interfaces, etc.). The router processes 116-118 are configured to provide a transparent interface to handle database requests. In particular, client 120 need not know that a database request is being served by a sharded database. The operation router processes receive such client requests and route the database requests to the appropriate chunks(s), e.g., 152-174 on shards 102-108.

According to some embodiments, the operation router processes are configured to identify primary nodes for handling the write operation from a plurality of database instances (e.g., each node or instance capable of handling the write operation). In further embodiments, enhanced arbiter nodes can be implemented in multi-writer distributed database, for example, as described in provisional patent application 62/180,232 filed on Jun. 16, 2015 incorporated by references in its entirety and included as Appendix A. Once a write operation is received by a primary node hosting the data, the primary node executes the write operation specified and records the operation to an operation log. The operation can be distributed throughout the database and the copies of the respective data.

According to some embodiments, the primary nodes implement an eventually consistent replication methodology whereby the operation is copied to any secondary nodes also responsible for that data. The secondary nodes execute the operation to bring the secondary nodes' data into agreement. In further embodiments, arbiter nodes are configured to receive and store each operation from the operation log distributed from the primary node. In some examples, the arbiter maintains a copy of the operations executed at the primary node. In further examples, the arbiter copy of the operation log can be limited in time to reduce overhead on the distributed database and minimize storage requirements. In some implementations, system configurations can specify five minute or ten minute windows for stored operations. The system configurations can specify a limited window of operations that are preserved in any arbiter copy. In one example, as the window is exceeded the oldest operations can be ejected (or archived) from an arbiter copy of the log in response to the receipt of new operations.

Figure 2:
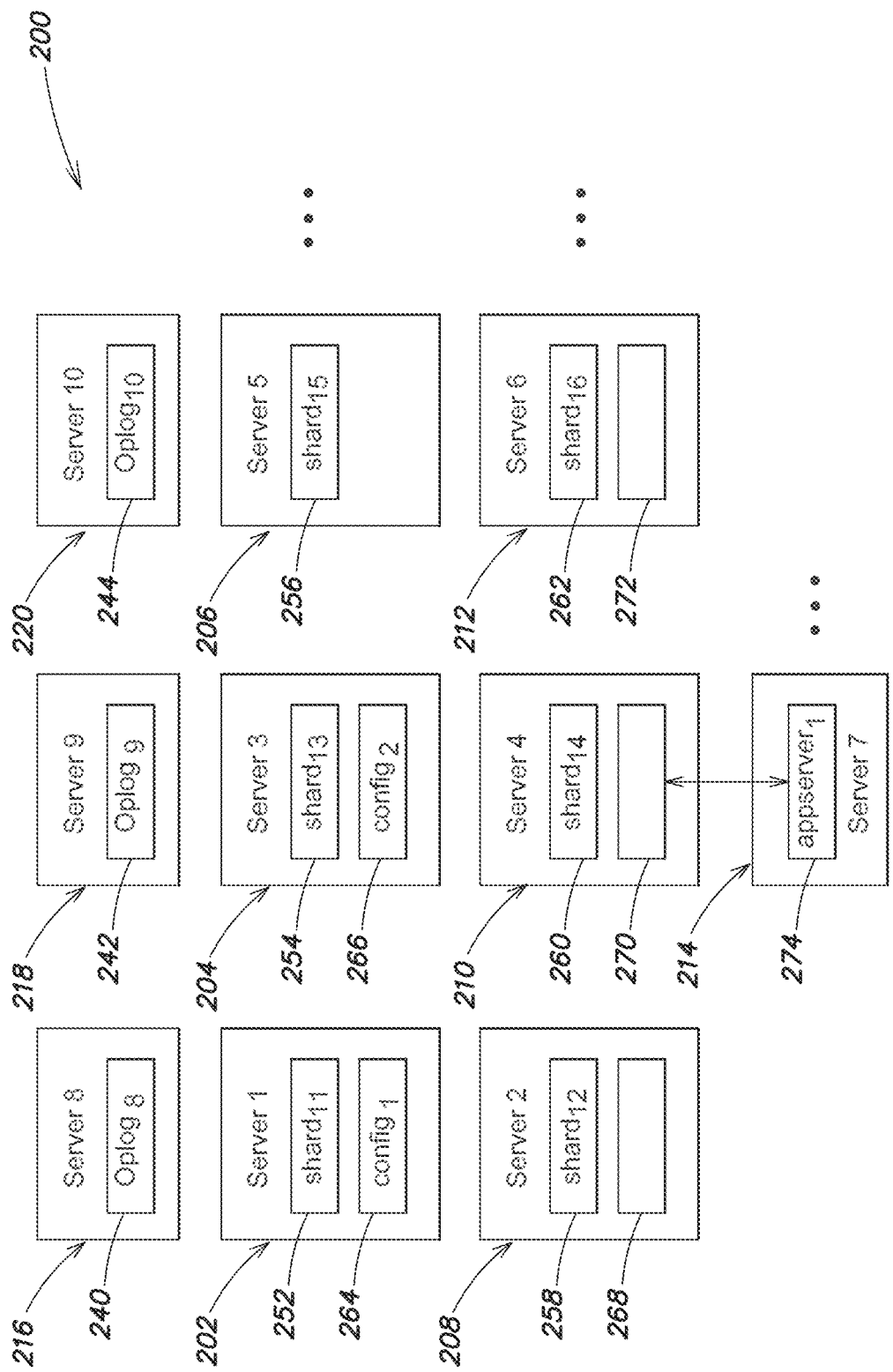
FIG. 2 illustrates a block diagram of an example architecture for a distributed database architected with database shards, according to one embodiment.

As discussed, FIG. 1 illustrates one example architecture for a distributed database. In other embodiments, sharding is not implemented and the database data is managed entirely via replica sets. In yet others, the database can be a hybridization of sharded elements and replica set elements. Shown in FIG. 2 is an example replica set 200, having a primary node 202, a secondary node 204 and an arbiter node 206. As discussed, primary nodes in a replica set (e.g., 202) handle write operations on a primary database copy (e.g., 208) and replicate the write operations throughout the database by executing each write operation and creating a log entry (e.g., in operation log 210) for the changes to the database. The primary nodes replicate the log entry to secondary nodes (e.g., 204). Secondary nodes host copies of the data and update the data (e.g., 212) based on replicated operations received from the primary node. The secondary nodes maintain a local operation log (e.g., operation log 214). Enhanced arbiter nodes are configured to receive logged operations from the primary node as well. Instead of using the logged operation to execute changes on a local copy of the database, as would be the case with secondary nodes, the enhanced arbiter node saves the logged operation directly into a local operation log (e.g., at 216).

In some embodiments, the arbiter nodes do not host copies of the database data, but only maintain operations received from a primary node in an operation log. In one example, the arbiters (e.g., 206) are configured to maintain recent operations in a respective operation logs (e.g., 216). Once the oldest operation in the log reaches a threshold and/or the operation log reaches a size boundary, the oldest operations can be archived or deleted, so that stale operations do not fill up the operation log. In some embodiments, the threshold and/or size can be set as database configurations. In one example, the system can be configured to permit a larger operation log on arbiter nodes. In some embodiments, the arbiter nodes have greater capacity and/or additional resources freed up by not maintaining copies of the database data.

In further embodiments, operation routing processes associated with a replica set can receive state information from the configuration processes specifying what roles have been assigned to each node and/or server in a distributed database. The router processes can use the state information to direct replication operations to the various servers in the cluster. Alternatively, each server can be provided information on other members of the clusters, and routing of replication operations can be handled, for example, by a primary node.

In response to a write or read request from a client, the request is communicated to a routing process to determine which database node is needed to respond with the appropriate data. In some embodiments, multiple routing processes can be implemented to route client requests to nodes having the appropriate data.

Routing process (e.g., 116 or 118 of FIG. 1) can be configured to forward a write operation to the appropriate node hosting the request data. According to other embodiments, and for example, a distributed database comprising only replica sets directing writes and reads from clients occurs via client driver configuration. In one example, the client drivers direct request to nodes with an appropriate role in a replica set (including, for example, directing writes to only primaries). In further example, the replica set members can be configured to return errors to protect against invalid requests from client drivers. In one instance, the replica set members are configured to return errors in response to write requests made against secondary nodes, protecting the replica set against invalid operations.

Once the appropriate node hosting the request data is selected, the node captures any relevant data, performs any writes, and returns the results of the execution (if necessary). In some examples, and in particular for sharded implementations, the routing process can be configured to merge the results from multiple nodes, as necessary, and communicate the result to the client. In some examples, the routing process communicates with an application layer that manages communication with the client.

As discussed, arbiters (e.g., 206) can be configured to facilitate commitment of a write operation. In some embodiments, the distributed database is configured with a durability guarantee such that once operations have reached greater than half of the nodes responsible for the written data, no loss of the data will occur. According to one embodiment, the arbiters increase the number of nodes that can be counted towards the majority requirement. In some embodiments, a primary node or the router process can be configured to execute a data query operation to confirm receipt of a replicated operation at a secondary node. Once a majority of secondary nodes have reported receipt, the operation is deemed committed. Arbiters can be configured to enhance this process by, for example, reporting when the arbiter has received a write operation and/or stored the write operation to its copy of the operation log. According to one embodiment, the distributed database system is configured to treat the arbiter having a copy of the operation log as a secondary for the purposed of distributed commitment protocols. Thus, as shown in FIG. 2 once a replicated operation reaches either the secondary 204 or the arbiter 206, the operations is deemed committed and will not be lost upon failures of the servers making up the cluster. FIG. 2 illustrates a minimal implementation of a replica set (e.g., one primary, one secondary, and one arbiter). In other implementations, larger numbers of secondary nodes can be available, as well as larger numbers of arbiters. Given nine nodes in a replica set comprised of one primary, secondary nodes, and enhanced arbiter nodes a write operation will be deemed committed upon reaching or being executed at any five of the nodes, including the primary node. Via the enhanced arbiter role the distributed database system is configured to handle the loss (or unreachability) of any four secondary nodes (e.g., given nine nodes in a replica set). The guarantee is valid even if arbiters or primary node are members of the four unreachable nodes.

Figure 3:
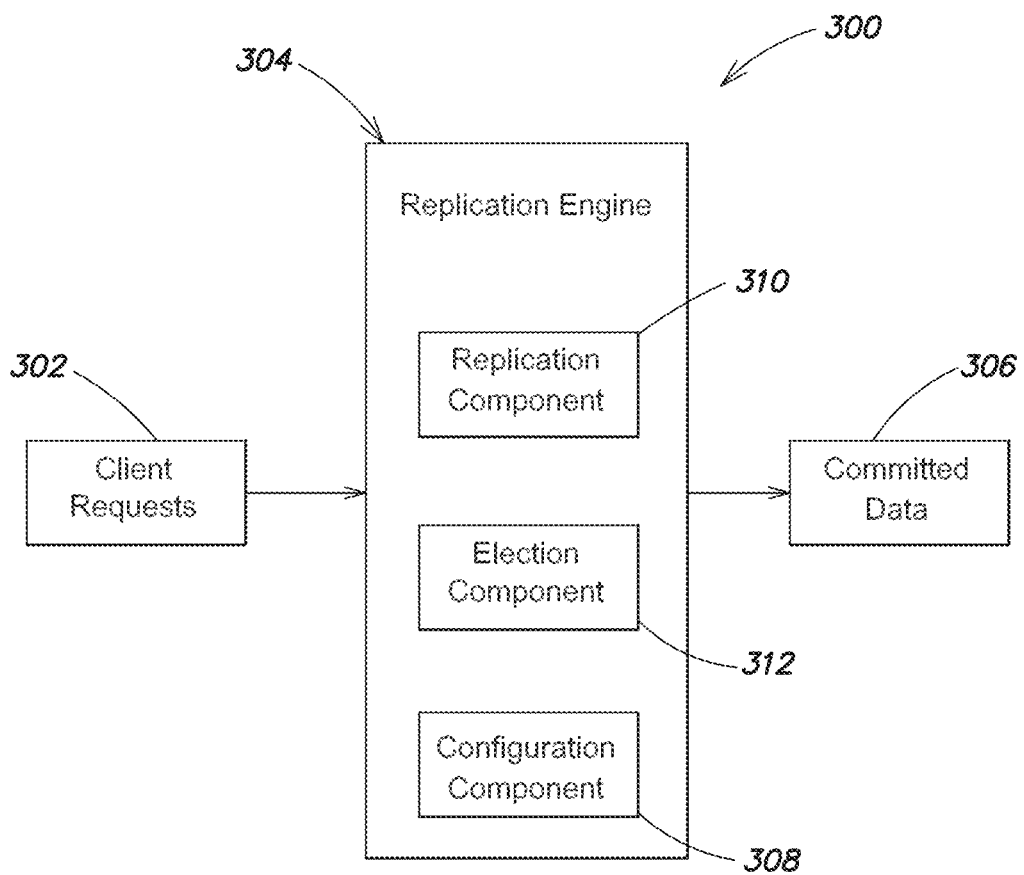
FIG. 3 illustrates a block diagram of an example distributed database system, according to one embodiment.

As primary nodes are configured to handle write request, various embodiments are configured to ensure availability of a primary node even during network partitions or failure events. For example, if the primary server or node is unreachable for any period of time, an election process is triggered to establish a new primary server or node. FIG. 3 is block diagram of an embodiment of a distributed database 300. The distributed database can include a replication engine 304 configured to process client data requests 302 (e.g., reads, writes (e.g., any modification to the database data), and any access to the data) and return data from the database in response to the client requests 302, as appropriate. The replication engine 304 and/or distributed database system 300 can be configured to accept write operations and direct any writes or modification to the database data to a primary node within the distributed database. According to one embodiment, the replication engine 304 and/or system 300 can be configured to assign roles to a plurality of nodes within a distributed database. The plurality of nodes is configured to host the database data and/or manage operations on the database data.

According to one embodiment, each node in the database that hosts a portion of the database data is initialized with at least a secondary node role. Secondary nodes are configured to host copies of the database data and can respond to read requests for database data. Primary nodes are configured to handle write operations against the database data (including, for example, any new data, new records, any modification, deletion, etc.). In some embodiments, primary nodes are elected from a group of secondary nodes. The replication engine 304 can be configured to execute election protocols when the database is first brought online or in response to a failure of a primary node. The replication engine can execute a variety of election protocols. In one embodiment, the replication engine is configured to follow a consensus-based election of a primary node, wherein a majority of available nodes must agree as to the best secondary node to take on primary responsibility. In further embodiments, arbiter nodes are configured to vote during the election protocol and the replication engine 304 can assign any number of nodes an arbiter role.

Typical election criteria can include electing only nodes with the freshest or newest data. Is some implementations, each secondary node in the distributed database will attempt to elect itself and broadcast a vote to the other nodes. Each node checks received votes and if its data is fresher votes for itself. Such protocols can be enhanced by the presence of the operation log stored on arbiters. For example, a secondary node can be configured to vote for itself if an arbiter log contains fresher data than a received vote even if the secondary node's data is older than a received vote. Thus, a secondary node that would not qualify for election can be made electable by availability of the arbiter's operation log.

According to further embodiments, the replication engine 304 can also be configured to facilitate data commitment 306 by counting receipt of a replicated operation at an arbiter towards a majority requirement for committing write operations. In some embodiments, the presence of a replicated operation at an arbiter is counted towards any data commitment requirement.

According to some embodiments, the system 300 and/or engine 304 can implement additional system components to manage certain replication, election, and/or configuration functions within the distributed database. For example, the system 300 and/or engine 304 can instantiate a configuration component 308 configured to manage configuration settings within the distributed database. In one example, the configuration component 308 generates a user interface that enables specification of roles (e.g., primary, secondary, and arbiter) for nodes of a distributed database. The configuration component 308 can be further configured to enable customization of data commitment requirements. In one implementation, the configuration component defines a default commitment rule that an operation must reach a majority of nodes before the operation is committed. The configuration component 308 can be configured to allow customization of the default process.

In another embodiment, the system 300 and/or engine 304 can include a replication component 310 configured to distribute write operations executed at primary nodes to secondary nodes for execution and to arbiter nodes for storage. The replication component can be further configured to request acknowledgements from secondary nodes and/or arbiter nodes in response to client requests. For example, a database client may request a safe write operation. The database system can be configured to determine that a threshold number of nodes (e.g., greater than half) have received the operations before acknowledging the safe write (e.g., where the write can be for data modification, data deletion, or data creation).

Figure 4:
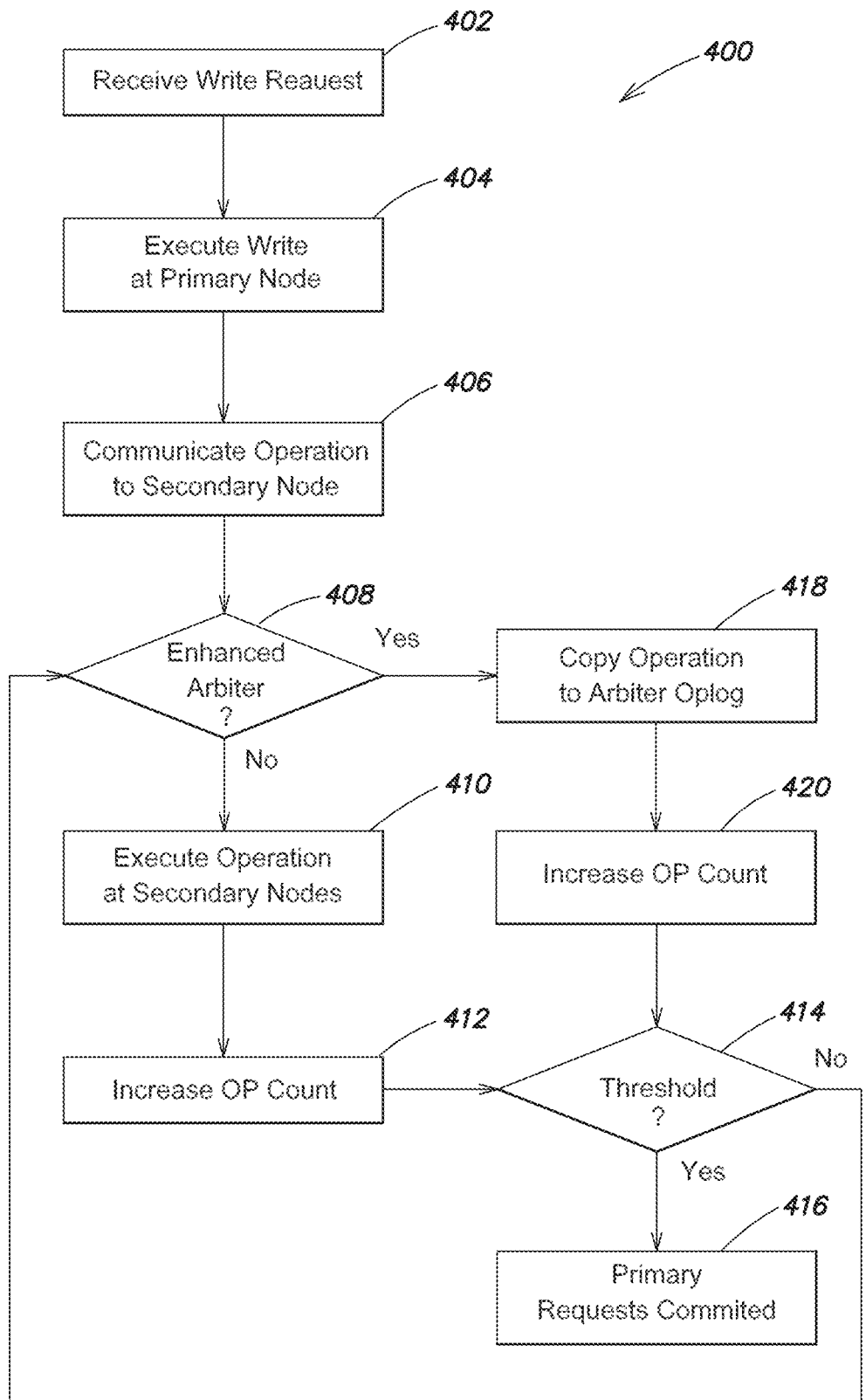
FIG. 4 illustrates an example process flow for committing operations with arbiter participation, according to one embodiment.

In one example, the replication component can be configured to execute an acknowledgement operation (e.g., getlasterror( )) to confirm receipt of replicated operations, for example, at secondary nodes. The acknowledgement function can retrieve information on the most recent operation executed on a node in the database, including for example, the most recent operation log entry made on an arbiter node. FIG. 4, described in greater detail below, illustrates one example process, 400 for replicating write operations with enhanced arbiter participation. Process 400 can be executed by the replication component 310, the replication engine 304, and/or the system 300.

In further embodiments, the system 300 and/or engine 304 can include an election component 312. The election component 312 can be configured to define the execution criteria for a primary node election. For example, the election component 312 can restrict election of a primary node to secondary nodes, and secondary nodes having the freshest data. In another example, the election component 312 can factor geographic position in election protocols. In some embodiment, the election component 312 is configured to oversee the election of the best new primary node based on a variety of factors. Each of the factors can be given a weight such that each secondary node votes for itself if it has the best weighted election value. For nodes with equivalent data, a geographic position can be evaluated to give one a better election value than another. In one example, the geographic position value is weighted to select nodes more proximate to the failed primary. In another example, location can be expressed in terms of a position within a rack in a datacenter in lieu of or in addition to geographic position. In one implementation, a secondary within the same rack as a failed primary can be favored over secondary nodes in nearby racks and/or secondary nodes in different geographic locations.

Figure 5:
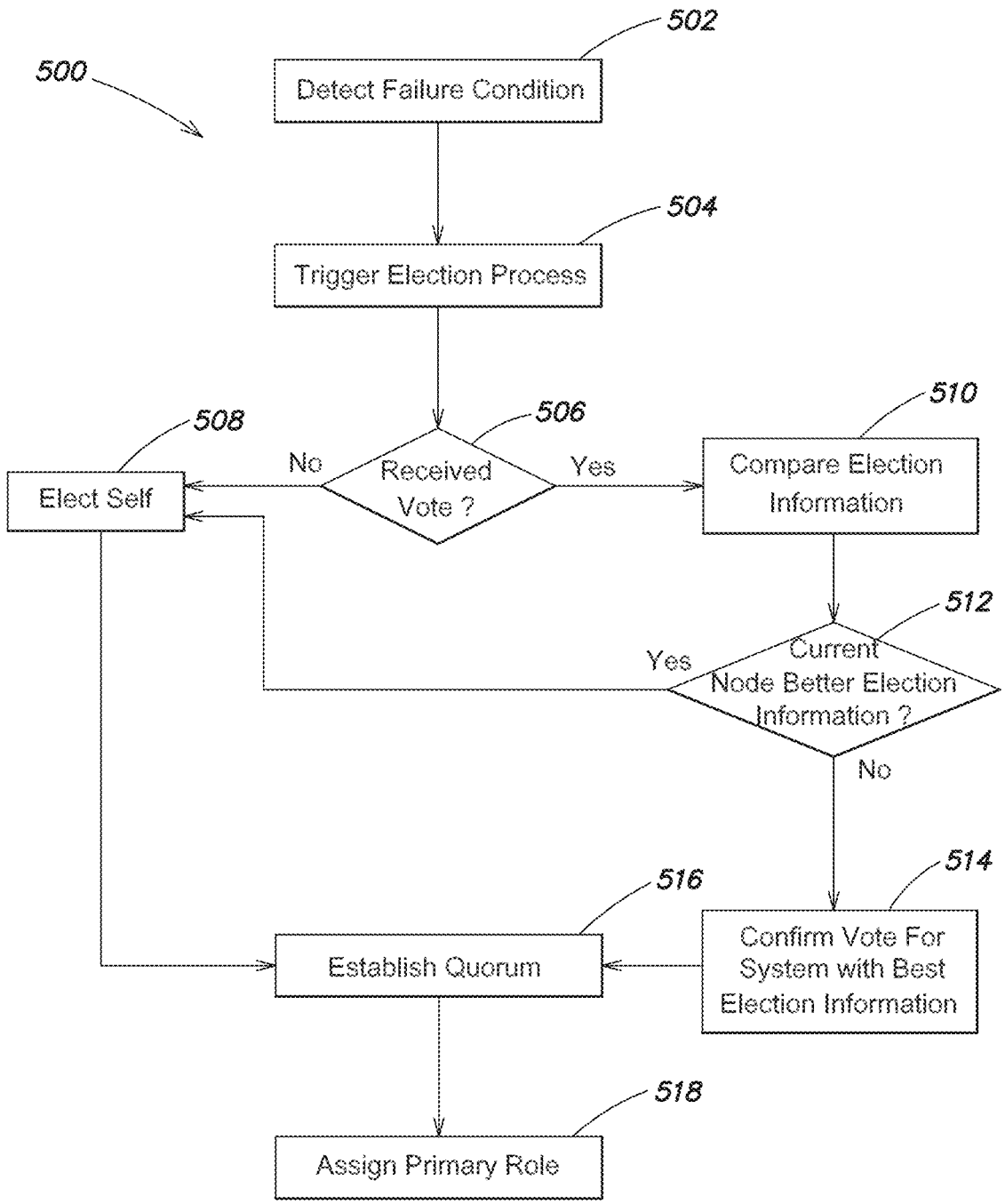
FIG. 5 illustrates an example process flow for consensus election with arbiter participation, according to one embodiment.

In one example system, the election protocol establishes a consensus by evaluating votes received from participating secondary systems to generate a quorum or consensus of reporting systems. In one example, a particular node can be voted for as the next primary system based on a query against the other nodes in the database to determine which node has the freshest data. Once the vote identifying a particular secondary system as the most up-to-date (or in another example, the server with the best location) reaches a threshold number of quorum participants, that secondary system is confirmed as the new primary. As a result, the elected system role/state is changed from secondary to primary and the remaining secondary systems set the new primary as the source for database update operations. According to some embodiments, the election does not require complete participation of the secondary nodes, and typically, only a majority of the secondary systems need to respond. The system propagates the change in the primary server to the remaining secondary nodes and the remaining secondary nodes update their configurations accordingly. The secondary servers then perform the operations necessary to bring the remaining secondary nodes in sync with the new primary database. FIG. 5, described in greater detail below, illustrates one example process, 500 for electing a new primary in response to detecting a failure in a primary node.

According to one embodiment, the replication engine 304 and/or components 308-312 can be distributed across a number of nodes making up the distributed database. In one example, the replication engine can execute across a plurality of shard servers in a sharded cluster, and can execute among members of a replica set. As discussed, a replica set can be configured to perform asynchronous replication across a series of nodes, with various processes implemented to handle recovery of primary node operations within the replica set, including consensus-based election of a primary node. Replica set configuration ensures high availability of the data. By modifying the replica sets to include arbiter operation logs as disclosed herein high availability of data reads can also be accompanied by increased durability and/or increase efficiency in durability for data writes.

In one example, a replica set can be a set of n servers, frequently three or more, each of which contains a replica of the entire data set for a given shard. One of the n servers in a replica set will always be a primary node. If the primary node replica fails, the remaining replicas are configured to automatically elect a new primary node. In various embodiments, replica sets can support a number of database configurations, including, sharded database configurations. For example, any logical partition in a distributed database can be maintained by a replica set. According to one embodiment, the enhanced arbiter role and the node configured to be the enhanced arbiter enables a minimal replica set configuration (e.g., one primary, one secondary and one arbiter) while preserving the execution of standard replica set operations (e.g., consensus election of primary, majority based commitment, etc.). Without the arbiter, a replica set would require two secondary nodes for the primary, in order to implement majority elections, and majority based commitment operations.

Process 400, FIG. 4, illustrates an example of a process for replicating write operations with arbiter participation in a distributed database system. Given a set of nodes on which a database is implemented, process 400 begins with receiving a write operation (e.g., data modification, data created, or data deletion) at 402. Prior to execution of process 400, nodes in distributed database can be assigned primary and secondary roles or primary nodes can be elected from groups of secondary nodes (including, for example, via process 500). Assignment of a primary node can occur as part of an initialization at start-up. In one alternative, assignment can occur based on the set of nodes that make up a replica set electing the primary at startup. Initialization can also include full replication of a database from one node to other node in the set. For example, a node may be added or initialized into a replica set using a synchronization operation that causes the node to capture a complete copy of database data as it exists on another node. Once synchronization is complete, replication operations can proceed for that node.

In some implementations, a single primary node provides a writable copy of a portion of database data, where write operations performed on the primary node are replicated asynchronously to all of the primary's secondary nodes which are responsible for at least the same data. The primary node replicates operations, for example, writes, by generating an operation log that reflects the operations performed on the primary database for example at 404. The operations can be transmitted asynchronously from the primary node to its respective secondary nodes, at 406. In some settings, the secondary nodes are configured to periodically query the operation log of the primary node to determine any operations that should be retrieved and executed. According to one embodiment, the operation log is configured to be part of the database itself. In another embodiment, the operation log is configured to not exceed a maximum size.

As operations occur they can be logged until the maximum log size is obtained, at which time the oldest operations are discarded or archived in favor of the newer operations. The operation log thus reflects a window of time for operations that can be replicated based on the permitted size of the operation log. The larger the size of the operation log, the greater the tolerance for downtime of nodes in the replica set. In one example, an operation log can be configured to a maximum size of 5-10% of the node's hard drive space. Other sizing for the operation log can be employed. For example, arbiter operation logs can be larger than operation logs maintained on nodes that also host data for the database. In some examples, database settings specify operation log size based on role (e.g., secondary roles have one setting, arbiter nodes have another, and the primary role can mirror the secondary or have yet another setting).

Each operation in the log can be associated with a time and/or an increasing value so that an order can be determined for each operation. In one example, a monotonically increasing value is employed and is associated with each operation. In one alternative, each operation can be time stamped. In one embodiment, the time stamp reflects the time of the primary node. Based on analysis of a first and last operation, a maximum operation log time can be determined. The maximum operation log time can be used in conjunction with replication operations to identify systems too far out of synchronization to replay operations from the log and thus require refreshing of the entire database. According to some embodiments, where enhanced arbiters hold a larger operation log than other nodes, this larger log can extend the window for which a node can be recovered by replaying operations.

In some embodiments, the operation log and all database metadata can be stored in the same types of data structures used to store application data. Maintaining the operation log and database metadata in this manner enables the system to reuse the storage and access mechanisms implemented for the database data. In some embodiments, primary and secondary nodes can be also configured with a local database which is not replicated. The local database can be configured to maintain information on local state. For example, a secondary node can maintain information on its lag time (any delay between synchronization with primary), time of last applied operation, address of primary node, as examples. Specific node configurations can also be configured in the node's local database.

In one embodiment, a secondary node executes a query against a primary node to determine all operations on the primary with a time stamp equal or greater than the last applied operation time stamp in its local database. In another embodiment, the secondary node can query the primary node to determine all operations on the primary with an operation value (the increasing value) greater than or equal to the operation value last executed on the secondary. Arbiter nodes can also be configured to query the primary node, and for example, process 400 can be executed with enhanced arbiters at 408 YES. In one example, arbiter nodes operate similarly to a secondary node with the data related operation.

If the distributed database does require enhanced arbiters, 408 NO. If not implemented, the primary node is still configured to respond to a client write operation by processing the write operation (e.g., 404) and replicate the operation to any secondary nodes. Without the arbiter node, a database architect is unable to take advantage of the reduced requirement for implementing an arbiter node as opposed to a secondary node.

According to one embodiment, a client requests database access through application protocol interfaces (APIs). An API can be configured to execute a driver that can identify a primary node in a replica set. In one example, a driver program is configured to connect to the entire replica set and identify any primary. The API, and/or an associated driver, can be configured to retain information on any identified primary node. In the event of primary node failure an error can be returned when a request asks a non-primary node to perform primary only operations, e.g., a write. In response to such an error, the API and/or any associated driver can be configured to re-identify a new primary node.

As discussed, the primary node generates an operation log for each database write operation, and, for example, the operation is replicated asynchronously to the secondary nodes at 406 and the secondary nodes execute the operation from the primary node's operation log at 410. According to one embodiment, the secondary nodes also record operation records to a secondary local operation log to track applied operations. During generation of the operation log on the primary node, each operation can be assigned a monotonically increasing value or other unique identifier to facilitate replication.

In further embodiments, each replicated operation can be associated with information specific to the primary node. For example, an identifier for the primary node can be assigned, and/or a time stamp can be assigned based on the primary node time and included in any communicated replication operation. The information specific to the primary node (e.g., time, primary identifier, monotonically increasing value, etc.) can be used to verify operation ordering and to identify any missing operations.

In one embodiment, the information specific to the primary node (e.g., timestamp, monotonically increasing operation value, primary node identifier, etc.) can be used by the system to determine a maximum operation time (i.e., time associated with the most recent operation) and the maximum operation time can be stored on a node for reporting or retrieval. In one example, the maximum operation time can be defined based on a monotonically increasing value and thus can be used to identify how up-to-date a secondary node's database is. In another example, timestamps for each operation can be used to determine how up-to-date the secondary node's database is. Various functions can request a maximum operation time from a node to determine the respective state of the node's database.

Returning to process 400, as each secondary node executes the operation an operation count can be updated at 412. For example, each secondary can acknowledge the operation to the primary node. In one alternative, the primary node can query the secondary nodes to determine execution and increase an operation count. If the count exceeds a threshold number of nodes (e.g., greater than half of responsible nodes) 414 YES, the primary acknowledges the safe write operation at 416.

Once an operation has been replicated at a threshold number of nodes, the operations can be guaranteed to be retained. For example, where the threshold number of nodes represents a majority of the nodes in a replica set, even in light of a failed primary, the operation that has reached the majority of nodes will be retained. Although automatic failover processing can result in lost data, an operation becomes durable once replicated across a majority of the nodes within any replica set. In one example, during a failover scenario an operation having reached a majority of nodes will be present on any node subsequently elected primary, preserving the operation. According to one embodiment, transactions that have not replicated to a majority of nodes in the replica set can be discarded during a failover scenario. For example, election of a new primary identifies a secondary node with the freshest data, and reintegration of the failed primary can result in loss of any data not present on the new primary.

Returning to 408 YES, process 400 can be executed in conjunction with enhanced arbiter nodes. At 418, the operation executed at 404 is replicated to secondary nodes at 406, and enhanced arbiter nodes at 418. Once the arbiter has stored the operation into its operation log, an operation count can be increased at 420. In one example, each arbiter can acknowledge the operation to the primary node. In one alternative, the primary node can query the arbiter nodes to determine execution and increase an operation count (e.g., at 420). If the count exceeds a threshold number of nodes (e.g., greater than half of responsible nodes) 414 YES, the primary acknowledges the safe write operation at 416. If the threshold test at 414 fails 414 NO, process continues until a sufficient number of secondary nodes or arbiter nodes have stored or executed the operations (e.g., via 410 and 412 or 418 and 420). In some embodiments, the determination of whether a threshold has been reached is made at the primary hosting the data being written.

In one embodiment, the threshold being tested at 414 is based on greater than half of the responsible nodes receiving the operation. If enhanced arbiters are being used they are included in the count of responsible nodes. In other words, the number of responsible nodes is equal to the nodes hosting the data being affected plus any arbiters maintaining a replication log for the data being affected. Once a majority of nodes are reached—the operation is deemed committed.

In some settings, a primary node can be configured to block write operations when secondary nodes are too far behind the primary node in performing their replicated write operations. In one example, a maximum lag value can be configured for a replica set that triggers a primary node to block write operations when the maximum lag value is exceeded. In one embodiment, the maximum lag time can be expressed as a maximum lag time for a threshold number of nodes. If the number of number nodes with a lag time in excess of the maximum exceeds the threshold, the primary node blocks write operations. In one implementation, nodes may report their lag time to the replication component periodically.

In another implementation, queries can be executed against nodes in the replica set to determine lag time. In some settings, secondary nodes can request that a primary node block write operations in response to lag time. Lag time can also be calculated and/or reported on by, for example, arbiter nodes based on queried maximum operation time. Additionally, arbiter nodes can report on status messages from secondary nodes that reflect maximum operation time for the given node. In some embodiments, secondary nodes are configured to provide reporting on status, and in some examples, can be configured to track status information on other nodes in a replica set. In one example, based on an operation log at the arbiter node, the system can automatically synchronize secondary nodes that exceed the maximum lag value but are still within the operation log window of the arbiter.

In some embodiments, nodes can be prevented from taking on the role of a primary to prevent data loss. In particular, transient failures of communication and even failure of an entire datacenter's power can occur in routine operation. In one embodiment, by configuring each node with a local uptime counter, a node can also include uptime information when in consideration for election to primary status. Requiring eligibility checks, for example based on uptime, can prevent data loss in the event of transient failures and even where a datacenter loses power. As the nodes in a replica set are restored, depending on the order in which the nodes return to operation, a secondary node could trigger a failover process. Failover procedures can result in the loss of data that has not replicated to a majority of nodes. Limiting a primary election process to eligible nodes can minimize resulting data loss.

According to one example, during replication and, for example, execution of process 400, a secondary node can identify based on the operation received whether there are any missing operations (e.g., prior operations which would lead to inconsistency if subsequent operations were executed out of order). In the event of missing operations, a secondary node can be configured to halt replication and enter an offline state. Once in the offline state, a node may require intervention to restore function. In further examples, a node can be automatically returned from halted replication by refreshing the entire database for the node.

According to some embodiments, if a node goes offline and comes back, the node is configured to review any accessible operation log (e.g., local operation log, current primary operation log, arbiter operation log, etc.). If that node cannot find an operation log that has all the operations from the intervening time, the node is configured to require a full resync in order to return to an active state. As discussed above, with an enhanced arbiters, the enhanced arbiters can be configured with an operation log spanning a longer time period than the primary node itself, thus the window of downtime that does not require a full resync is extended.

In one alternative example, a secondary node can be configured to synchronize its data by querying an enhanced arbiter node to retrieve operations from the arbiter operation log. If capable of being update by the arbiter, the secondary node can return to an online status.

In some embodiments, the transaction log of the operations performed on the primary node can reflect optimizations and/or transformations of the operations performed at the primary node. For example, increment operations performed on the master database can be transformed into set operations. In some examples, operations performed on the primary can be merged prior to generating an entry on the transaction log reducing the overall number of operations replicated to the secondary nodes.

Additional embodiments may execute different processes for replicating write operations with arbiter participation. According to one embodiment, an example process can include receipt of a write request at a primary node of a replica set. The primary node executes the write request, and logs the operation. Secondary nodes can query the primary node periodically to obtain information on the primary's operation log. In one example, secondary nodes are configured to retrieve new operation log entries via a "tailable cursor." Tailable cursors are conceptually equivalent to the tail UNIX command with the -f option (i.e. with "follow" mode). After the primary executes any write operation (e.g., a client insert new or additional documents into a collection), the tailable cursor executed by the secondary node identifies the subsequent entry into the primary's operation log. The secondary node captures the new operation and executes it against the secondary node's copy of the database data.

According to another embodiment, primaries do not proactively communicate to the secondary nodes. Rather the secondary nodes query the primary node's operation log. In further embodiments, to validate a threshold for replication has been reached, another asynchronous process can be used. The asynchronous commitment protocol can be configured to check a status board for write operations to determine if the write operations have been completed by a threshold number of nodes. During execution of the commitment protocol, the status board can be updated (e.g., asynchronously) by the secondary nodes and/or any enhanced arbiters when they receive and/or execute an operation.

To provide another example algorithm for replication, the operations performed by a five member replica set is described:

1) Primary A: receives a write request. A thread T executed on the primary handles this operation, writes the operation to log, and goes to sleep with a timer.
2) Secondary Nodes and Arbiter Nodes: constantly stream an operation log from primary (e.g., via tailable cursor). As the secondary nodes execute the logged operations (e.g., writes) in batches, the secondary nodes update the primary node on the most recent executed operation. Arbiter nodes copy the logged operations to their operation log and notify the primary of the most recent logged operation. In one example, the secondary nodes and arbiter nodes write to a status board on the primary node to notify the primary of replication status.
3) Thread T wakes up and checks its status board. Secondary Node B has written operations from the log until operation 650, Secondary Node C has written operations up to 670, Secondary D has written operations to 650, Arbiter Node E has logged operations up to operation 650. With the given stats of the nodes—only A and C have operation 654. No majority has been reached for any operations after 650. Thread T goes to sleep.
4) Secondary Node B receives a batch of operations, up to operation 670. Secondary Node B applies the operations, and writes to the primary status board "done through 670."
5) Thread T wakes up and checks status board again. Thread T identifies Secondary nodes B and C have applied operations more recent than operation 654—so including the primary node A, a majority a majority of nodes have executed and/or logged the operation.
6) Responsive to determining that the majority has been reach, thread T acknowledges to the client that the write is complete.
   Alternative to 4)-6): at 4) Arbiter Node E receives a batch of operations up to operation 670. Arbiter Node E records the batch of operations into its operations log and writes to the primary status board on the primary "done through 670." 5) and 6) proceed as above but on the basis that nodes C and E as well as the primary node has executed and/or logged the operations up to operation 670.

In some implementations, in addition to hosting read only replicas of the primary database the secondary nodes are configured to assist in the operation of the distributed database or in a replica set. In particular, the secondary nodes participate in protocols to elect a new primary node in the event of failures. Such protocols can be based on establishing a new primary node based on a quorum of participating nodes. Such a quorum protocol can be configured to require majority participation, for example, or can be configured require a threshold number of participants prior to completing any quorum protocol.

In some embodiments, each secondary node can be configured to participate in an election protocol that establishes by quorum comprising a threshold number of nodes that a particular node should be the new primary node. For example, the secondary node can be configured to join and/or announce membership in a group of secondary nodes that have also identified a particular node as the next primary node. Once the number of members in the group/quorum reaches a threshold number, the elected node can be assigned a primary role.

In one example, an arbiter system can collect status information on quorum participants. The arbiter system can be further configured to communicate the quorum result and/or trigger the status change to primary on another. In some embodiments, the quorum protocol is configured to require that a majority of the nodes responsible for the written data participate in the quorum prior to sending an acknowledgement. According to one embodiment, once a quorum is obtained the secondary node identified by the quorum becomes the new primary. Client drivers will re-direct write request to the new primary node.

One example of an election process includes querying all other nodes for their most recently applied operation. In one example, a maxappliedoptime function can be executed to capture information on a most recently applied operation. The information can be captured from timestamps, operation values indicative of order, among other options.

In one example, the election protocol is defined to elect a node with the most recent data. For a node that determines it has the freshest data set (e.g., the most recently applied operation is the most recent operation available to any currently reachable member of the replica set), that node will vote for itself. In some embodiments, the self-vote operation can be restricted to nodes that can communicate with a majority of nodes in the replica set.

Upon receipt of a vote message, a given node will determine if its data is fresher and if not, confirm the received vote, and if yes, respond to the vote message with a negative vote. The example process can be augmented, by including timeouts for sending vote messages. For example, after confirming a vote or electing itself, a node can be configured to respond negatively to all other vote messages for a period of time. In addition, the above process can be repeated until a node is elected. In some examples, tie resolution can include a random wait period and a new check for freshest data/maxapplied optime.

FIG. 5 is an example process flow 500 for consensus election with arbiter participation. Various steps in the example algorithm can be executed by individual nodes while participating in a consensus election protocol. Other steps of the process describe states associated with the replica set as individual nodes perform the described operation. Process 500 begins at 502 with the detection of a failure event. Failure events can be based on communication failures. For example, each node in the distributed database or in a replica set can be configured to provide periodic messages to all other known members of a replica set, indicating it is still up and reachable, known as a heartbeat. The absence of the heartbeat message permits identification of communication failures. Other examples include secondary nodes that receive error messages when attempting to query their primary nodes. Further, power failures and/or hardware failures on nodes can result in a failure event that triggers an election protocol at 504. The first node to participate in the election process will not have received any vote messages from any other nodes at 506 NO and will seek to elect itself at 508.

For other nodes participating in the election, the node may 506 YES or may not 506 NO have received a message from other nodes requesting that the node confirm a received vote. If a vote is received 506 YES, a node compares the election information of the received vote against its own values at 510. If the node has greater election values, for example, a higher priority, fresher data, better location, size of hardware, etc., the node attempts to elect itself at 508. In some embodiments, each node will evaluate itself on election protocol requirements. One example protocol includes a freshest data requirement. Another example of an election protocol requirement includes a freshest data and a location requirement (e.g., closest to failed primary). Another example of an election protocol requirement includes freshest data with greatest uptime.

According to some embodiments, the evaluation of better election information at 512 can include evaluation of data available via arbiter operation logs. For example, a secondary node can be configured to evaluate its data against other voting peers based on whether the secondary node can achieve a freshest data value equal or better than another node by capturing operations from an arbiter operation log. If the secondary node can achieve the same or better freshest data value and include other better evaluation criteria 512 YES, the secondary node can elect itself at 508 and update its data accordingly.

The systems that attempt to elect themselves and nodes that offer a confirmation will become part of a group of systems representing the group of nodes and an identification of a node that can take on the primary node role. Any node can enter a group either by electing itself at 508 or by confirming a vote for another node at 514. Once a majority of nodes are in agreement on a new primary, a quorum has been established at 516. If agreement has not been reached 516 NO, further evaluation of votes or attempts to self-elect continue via branches 506 YES or 506 NO.

If for example at 512 NO, it is determined that a node receiving a vote does not have election information greater than the received vote (either with or without arbiter participation), then the receiving node confirms the vote for the node with the best election information at 514. If the receiving node has better election information 512 YES, the receiving node can vote for itself at 508. Once the group of secondary nodes reaches a threshold value for the number of participating systems (i.e. a quorum is established at 516), the node identified for primary by the majority of participating nodes is assigned the primary node role at 518. In one embodiment, a threshold is set to require a majority of the nodes in the distributed database or replica set to agree on the next primary node. Other embodiments can use different threshold values.

The end result of the execution of individual election operations, for example, in process 500 (e.g., 502-514) is the establishment of an agreement between at least a threshold number (e.g., a majority) of the responsible nodes on which node should be primary (e.g., 516 YES). The reaching of agreement by the threshold establishes a quorum of responsible nodes on which node should be elected primary. Last, once the quorum has been reached, clients are directed to the primary node in response to access requests. In some embodiments. administration operations can be executed so that routing processes and/or configuration processes identify the newly elected primary as the primary node for an active replica set (e.g., assigning the primary role at 518).

Figure 6:
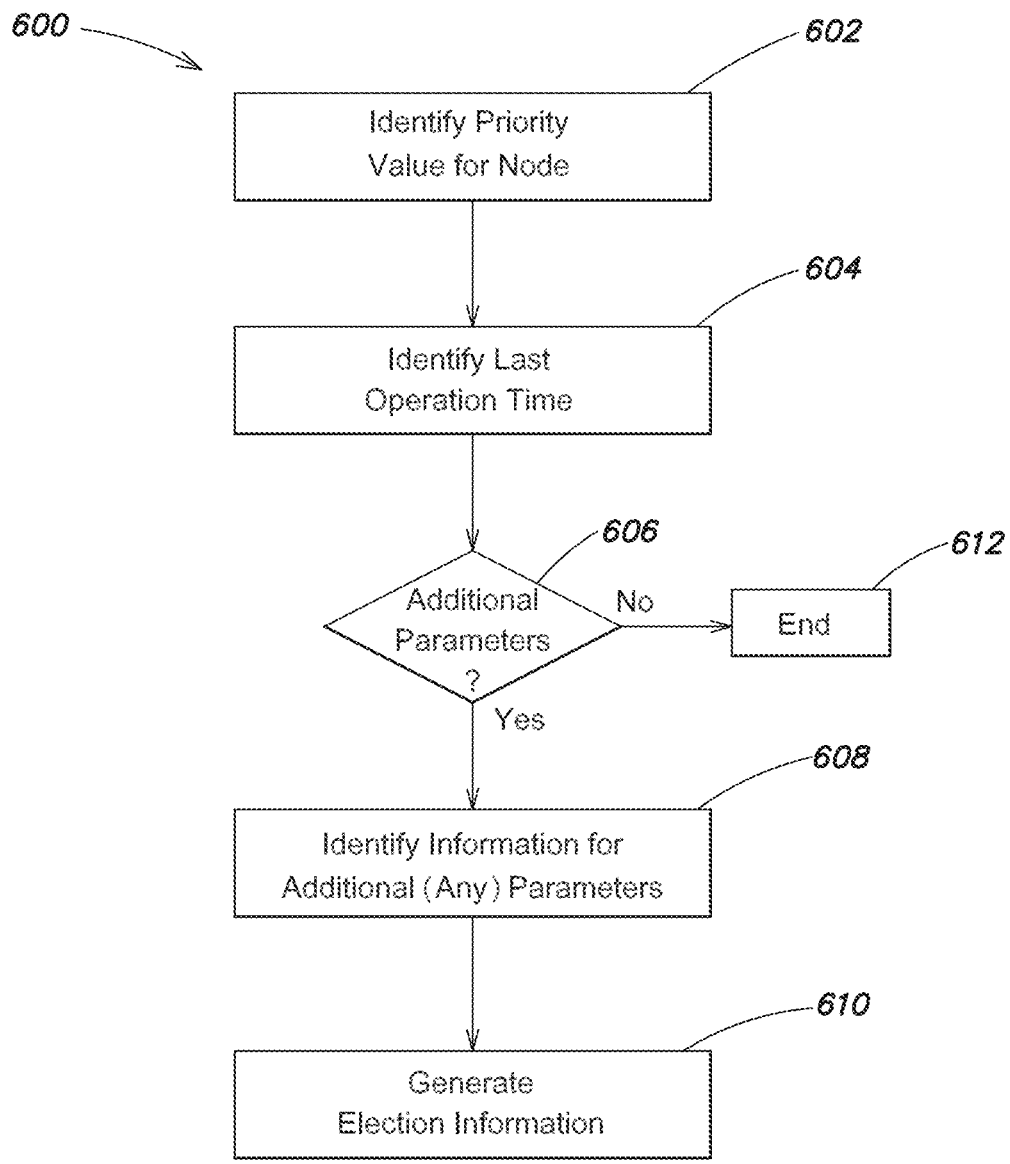
FIG. 6 illustrates an example process flow for determining election information, according to one embodiment.

Further, the calculation of election values can include execution of election information generation sub-process. An example process 600 for determining election information is illustrated in FIG. 6. Process 600 begins with a node determining its priority from its local database at 602. In addition to priority value, a value associated with the node's last executed operation can be retrieved from the node's the local database at 604. In the event of equal priority value, the node with the freshest data will be elected (i.e. the node with the better operation value).

In one example, the node with the smallest lag time from the former primary node will generate the highest election value. Other embodiments can resolve additional parameters in determining its election value. For example, 606 YES, additional parameters can be included in the determination of a node's election information at 610. In one embodiment, location of the node can be given a value depending on a preferred location and captured at 608. For example, the greater the distance from a preferred location the smaller the location value assigned to that node.

In another embodiment, nodes within the same rack as the former primary node can be favored over other nodes in the replica set. In yet another embodiment, location values can depend on geographic position, and a node with a different location than the current primary node can be favored. In another embodiment, a hardware resource capability (e.g., disk size, RAM, etc.) of a node can be assigned a value in determining an overall election value. Communication history can also be factored into election information for a particular node. For example, historic communication stability can improve a determined election value, and conversely a history of communication failure can lower an election value. In one example, each of the parameters can have a value and the node with the greatest total value can be elected. In other examples, each of the parameters is weighted (e.g., freshest data can have a large value relative to location, hardware, etc.) to favor selected ones of the parameters. Giving a freshest data value the highest weighting (e.g., 0.6*"freshest data value", 0.2*"location value", 0.1*"hardware score", 0.1*"uptime score"—sets total election value), reflects emphasis on freshest data, for example.

If election information has been received from another node, and for example, the present node has a lower priority value, and/or older data that cannot be made better or equal through an arbiter operation log 606 NO, evaluation of the election information at 612 triggers the present node to confirm the node with better election information at 614 via 612 NO. If no election information has been received, a node can skip evaluation at 612 or determine that based on current information it has the best information 612 YES and aggregate election information for an attempt to self-elect at 616. In one example, the election value can include priority, last operation time, location, and hardware configuration. Other embodiments can use different values, different combination, or subsets of the identified parameters and generate election information/election values including those parameters at 610.

According to one embodiment, once a new primary system is elected, the replica set continues to respond to read and write operations normally. For clients with connections established to the former primary node, errors will be returned as the client attempts to perform operations against the former primary. The errors can be returned based on an inability to communicate if, for example, a communication failure caused a new primary to be elected. Errors will also be returned if the former primary itself failed. Additionally, errors will also be returned if the former primary has been re-established as a secondary node. In response to a write operation, a former primary responds with an error message indicating that it is not primary. In one embodiment, the former primary can also be configured to respond with the address of its current primary. In one alternative, a client can discover a new primary in response to the error message. A new primary may need to be discovered any time the primary node changes from one node to another in a replica set. Discovery can occur by connecting to the entire replica set, as one example. In one alternative, the node returning a not primary error message can be configured to identify the node it believes is primary and if the node returning the error message does not have the address of the primary yet, that state can be indicated in a returned error message. The return of additional information with the not primary error message can be limited to systems that had the primary node responsibility within a configurable amount of time from receiving the request.

The various functions, processes, and/or pseudo code described herein can be configured to be executed on the systems shown by way of example in FIGS. 1-3. The systems and/or system components shown can be specially configured to execute the processes and/or functions described. Various aspects and functions described herein, in accord with aspects of the present invention, may be implemented as specially configured hardware, software, or a combination of hardware and software on one or more specially configured computer systems. Additionally, aspects in accord with the present invention may be located on a single specially configured computer system or may be distributed among one or more specially configured computer systems connected to one or more communication networks.

For example, various aspects, components, and functions (e.g., shard, node, data router, application layer, replication component, election component, configuration component, etc.) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 8:
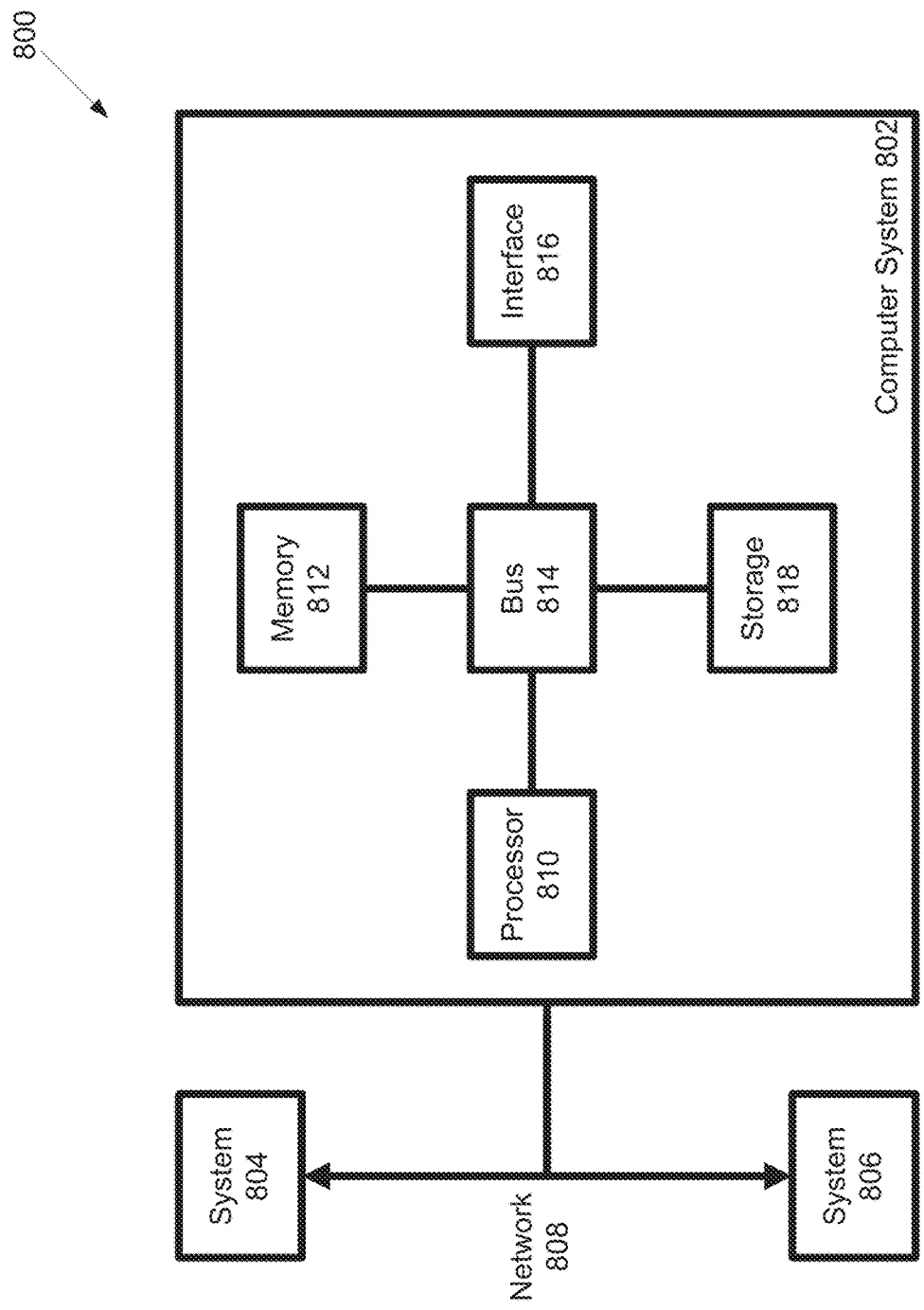
FIG. 8 is a block diagram of an example special purpose computer system specially configured to host one or more elements of a distributed database system on which various aspects of the present invention can be practiced.

Referring to FIG. 8, there is illustrated a block diagram of a distributed special purpose computer system 800, in which various aspects and functions are practiced (e.g., including a replication component (e.g., captures executed write operations and distributes to nodes hosting the same copy of data), a configuration component (e.g., enables arbiter participation in either or both data commitment and primary election), an election component (e.g., triggers election protocols in response to primary failure), among other options). As shown, the distributed computer system 800 includes one or more special purpose computer systems that exchange information. More specifically, the distributed computer system 800 includes computer systems 802, 804 and 806. As shown, the computer systems 802, 804 and 806 are interconnected by, and may exchange data through, a communication network 808. For example, a segment of a distributed database can be implemented on 802, which can communicate with other systems (e.g., 804 and 806), which host other or remaining portions of the database data, and or copies of the database data.

In some embodiments, the network 808 may include any communication network through which computer systems may exchange data. To exchange data using the network 808, the computer systems 802, 804 and 806 and the network 808 may use various methods, protocols and standards, including, among others, TCP/IP, or other communication standard, and may include secure communication protocols VPN, IPsec, etc. To ensure data transfer is secure, the computer systems 802, 804 and 806 may transmit data via the network 808 using a variety of security measures including, for example, TLS, SSL or VPN or other standard. While the distributed computer system 800 illustrates three networked computer systems, the distributed computer system 800 is not so limited and may include any number of computer systems and computing devices, networked using any medium and communication protocol.

As illustrated in FIG. 8, the special purpose computer system 802 includes a processor 810, a memory 812, a bus 814, an interface 816 and data storage 818 and further includes any one or more of the component discussed above to implement at least some of the aspects, functions and processes disclosed herein, as either a stand-alone system or part of a distributed system. In some embodiments, the processor 810 performs a series of instructions that result in manipulated data. The processor 810 may be any type of processor, multiprocessor or controller. The processor 810 is connected to other system components, including one or more memory devices 812, by the bus 814.

The memory 812 stores programs and data during operation of the computer system 802. Thus, the memory 812 may be a relatively high performance, volatile, random access memory such as a dynamic random access memory (DRAM) or static memory (SRAM) or other standard. However, the memory 812 may include any device for storing data, such as a disk drive, hard drive, or other non-volatile storage device. Various examples may organize the memory 812 into particularized and, in some cases, unique structures to perform the functions disclosed herein. These data structures may be sized and organized to store values for particular to specific database architectures and specific data types, and in particular, may include standardize formats for organizing and managing data storage.

Components of the computer system 802 are coupled by an interconnection element such as the bus 814. The bus 814 may include one or more physical busses, for example, busses between components that are integrated within the same machine, but may include any communication coupling between system elements including specialized or standard computing bus technologies such as IDE, SCSI, PCI and InfiniBand or other standard. The bus 814 enables communications, such as data and instructions, to be exchanged between system components of the computer system 802.

The computer system 802 also includes one or more interface devices 816 such as input devices, output devices and combination input/output devices. Interface devices may receive input or provide output. More particularly, output devices may render information for external presentation. Input devices may accept information from external sources. Examples of interface devices include keyboards, mouse devices, microphones, touch screens, printing devices, display screens, speakers, network interface cards, etc. Interface devices allow the computer system 802 to exchange information and to communicate with external entities, such as users, vendors, and other systems.

The data storage 818 includes a computer readable and writeable nonvolatile, or non-transitory, data storage medium in which instructions are stored that define a program or other object that is executed by the processor 810. The data storage 818 also may include information that is recorded, on or in, the medium, and that is processed by the processor 810 during execution of the program. More specifically, the information may be stored in one or more data structures specifically configured to conserve storage space or increase data exchange performance.

The instructions stored in the data storage may be persistently stored as encoded signals, and the instructions may cause the processor 810 to perform any of the functions described herein. The medium may be, for example, optical disk, magnetic disk or flash memory, among other options. In operation, the processor 810 or some other controller causes data to be read from the nonvolatile recording medium into another memory, such as the memory 812, that allows for faster access to the information by the processor 810 than does the storage medium included in the data storage 818. The memory may be located in the data storage 818 or in the memory 812, however, the processor 810 manipulates the data within the memory, and then copies the data to the storage medium associated with the data storage 818 after processing is completed. A variety of components may manage data movement between the storage medium and other memory elements and examples are not limited to particular data management components. Further, examples are not limited to a particular memory system or data storage system.

Although the computer system 802 is shown by way of example as one type of computer system upon which various aspects and functions may be practiced, aspects and functions are not limited to being implemented on the computer system 802 as shown in FIG. 8. Various aspects and functions may be practiced on one or more specially configured computers having different architectures or components than that shown in FIG. 8 which can be modified to include the specially purpose components and/or functions discussed. For instance, the computer system 802 may include specially programmed, special-purpose hardware, such as an application-specific integrated circuit (ASIC) tailored to perform any one or more operations disclosed herein (e.g., validating received operations, routing write operations, replicating operations, among other examples). While another example may perform the same function(s) using a grid of several computing devices running MAC OS System X with Motorola PowerPC processors and several specialized computing devices running proprietary hardware and operating systems.

The computer system 802 may be a computer system including an operating system that manages at least a portion of the hardware elements included in the computer system 802. Additionally, various aspects and functions may be implemented in a non-programmed environment, for example, documents created in HTML, XML or other format that, when viewed in a window of a browser program, can render aspects of a graphical-user interface or perform other functions.

According to one embodiment, a distributed database can include one or more data routers for managing distributed databases. The one or more data routers can receive client request (e.g., user entered data requests, data requests received from an application programming interface (API), or other computing entity requests) and route requests to appropriate servers, systems, or nodes within the distributed database. In some embodiments, one or more data routers can be configured to communicate replication operations to arbiter nodes based on configurations of the distributed database. In other embodiments, the data routers can deliver requests to local entities (e.g., a replica set) which can distribute operations (e.g., including write operations) to any member of the replica set including any arbiters.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A computer implemented method for managing a distributed database, the method comprising:
    establishing at least one primary node within a plurality of nodes, wherein the plurality of nodes comprise a distributed database system and the distributed database system provides responses to database requests from database clients;
    establishing at least one secondary node configured to host a replica of data of the at least one primary node from the plurality of nodes and update the replica responsive to received replicated operations from the at least one primary node;
    establishing at least one arbiter node configured to host an operation log of operations executed by the at least one primary node, wherein the at least one arbiter node does not host a replica of the data; and
    electing a new primary node responsive to detecting a failure of the at least one primary node, wherein electing the new primary node includes:
        executing a consensus protocol to elect one of the at least one secondary node as the new primary node, wherein the consensus protocol includes participation of the at least one secondary node and the at least one arbiter node associated with the failed at least one primary node;
        evaluating election criteria at the at least one secondary node during an election period;
        communicating by a respective one of the at least one secondary node i) a self-vote responsive to determining that the respective one of the at least one secondary node meets the election criteria, or ii) a confirmation of a received vote of another secondary node responsive to determining that the another secondary node is more suitable to be elected as the new primary node based on the election criteria; and
        evaluating by the respective one of the at least one secondary node the operation log of the at least one arbiter node as part of the acts of determining.

2. The method according to claim 1, further comprising restricting processing of write operations, received from the database clients, to the at least one primary node.

3. The method according to claim 1, further comprising an act of communicating the self-vote responsive to querying the operation log of the at least arbiter node and determining that the operation log of the at least arbiter node is more up to date than operation logs of one or more of the at least one secondary node based on received election information.

4. The method according to claim 1, wherein the election criteria include at least one of, or any combination of, or two or more of: a most recent data requirement, a location requirement, a hardware requirement, and an uptime requirement.

5. The method according to claim 3, wherein responsive to the respective one of the at least one secondary node determining that the operation log of the at least arbiter node includes the most up to date data, triggering an update of a replica of the data hosted by the respective one of the at least one secondary node.

6. The method according to claim 1, further comprising an act of committing write operations responsive to safe write requests received from the database clients, wherein committing the write operations includes counting an act of logging the write operations at the at least one arbiter node towards any commitment requirements.

7. The method according to claim 1, wherein the at least one arbiter node is configured to limit participation in replication operations at the at least one arbiter node to updating the operation log without replication of the operations on respective data.

8. The method according to claim 1, wherein the at least one arbiter node is configured to provide operations stored in the operation log to one or more of the at least one secondary node.

9. A distributed database system, the system comprising:
    at least one processor operatively connected to a memory, wherein the at least one processor when running is configured to execute a plurality of system components, wherein the plurality of system components comprise:
        a configuration component configured to establish a role associated with each node in a plurality of nodes, wherein the configuration component is configured to establish at least one primary node with a primary role, at least one secondary node with a secondary role, and at least one arbiter node with an arbiter role;

the at least one primary node configured to:
  host data;
  execute write operations on at least a portion of the data and generate at least one log entry for execution of the write operations;
  replicate the at least one log entry to the at least one secondary node and the at least one arbiter node;
the at least one secondary node configured to:
  host a replica of the data of the at least one primary node;
  execute the at least one log entry received from the at least one primary node to update a respective copy of the at least a portion of the data;
the at least one arbiter node configured to update an operation log of operations responsive to receipt of the at least one log entry for the write operations from the at least one primary node, wherein the at least one arbiter node does not host a replica of the data;
an election component configured to elect a new primary node responsive to detecting a failure of the at least one primary node, wherein the election component is further configured to:
  execute a consensus protocol to elect one of the at least one secondary node as the new primary node, wherein the consensus protocol includes participation of the at least one secondary node and the at least one arbiter node associated with the failed at least one primary node;
  evaluate election criteria at the at least one secondary node during an election period;
  communicate i) a self-vote for a respective one of the at least one secondary node responsive to determining that the respective one of the at least one secondary node meets the election criteria, or ii) a confirmation of a received vote of another secondary node responsive to determining that the another secondary node is more suitable to be elected as the new primary node based on the election criteria; and
  evaluate the operation log of the at least one arbiter node as part of the acts of determining.

10. The system of claim 9, further comprising a replication component configured to restrict the write operations received from client computer systems to the at least one primary node having the primary role.

11. The system according to claim 9, wherein the election component is distributed through one or more nodes comprising the distributed database system.

12. The system according to claim 11, wherein the election component is distributed at least through the at least one secondary node and the at least one arbiter node.

13. A computer implemented method for managing a distributed database, the method comprising:
  establishing at least one primary node configured to host data;
  establishing at least one secondary node configured to host a replica of the data hosted by the at least one primary node;
  establishing at least one arbiter node, the at least one arbiter node configured to host an operation log of operations executed by the at least one primary node, wherein the at least one arbiter node does not host a replica of the data hosted by the at least one primary node or the at least one secondary node;
  electing a new primary node responsive to detecting a failure of the at least one primary node, wherein electing the new primary node includes:
    executing a consensus protocol to elect one of the at least one secondary node as the new primary node, wherein the consensus protocol includes participation of the at least one secondary node and the at least one arbiter node associated with the failed at least one primary node;
    evaluating election criteria at the at least one secondary node during an election period;
    communicating by a respective one of the at least one secondary node i) a self-vote responsive to determining that the respective one of the at least one secondary node meets the election criteria, or ii) a confirmation of a received vote of another secondary node responsive to determining that the another secondary node is more suitable to be elected as the new primary node based on the election criteria; and
    evaluating, by the respective one of the at least one secondary node, the operation log of the at least one arbiter node as part of the acts of determining.

14. The method according to claim 13, further comprising an act of communicating the self-vote responsive to querying the operation log of the at least arbiter node and determining that the operation log of the at least arbiter node is more up to date than operation logs of one or more of the at least one secondary node based on received election information.

15. The method according to claim 13, wherein the election criteria include at least one of, or any combination of, or two or more of: a most recent data requirement, a location requirement, a hardware requirement, and an uptime requirement.

16. The method according to claim 14, wherein responsive to the respective one of the at least one secondary node determining that the operation log of the at least arbiter node includes the most up to date data, triggering an update of a replica of the data hosted by the respective one of the at least one secondary node replica.

17. The method according to claim 13, further comprising an act of committing write operations responsive to safe write requests received from database clients, wherein committing the write operations includes counting an act of logging the write operations at the at least one arbiter node towards any commitment requirements.

18. A distributed database system, the system comprising:
  at least one processor operatively connected to a memory, wherein the at least one processor when running is configured to execute a plurality of system components, wherein the plurality of system components comprise:
  a configuration component configured to:
    establish at least one primary node configured to host data;
    establish at least one secondary node configured to host a replica of the data of the at least one primary node; and
    establish at least one arbiter node, the at least one arbiter node configured to host an operation log of operations executed by the at least one primary node, wherein the at least one arbiter node does not host a replica of the data;
  an election component configured to elect a new primary node responsive to detecting a failure of the at least one primary node, wherein the election component is further configured to:
    execute a consensus protocol to elect one of the at least one secondary node as the new primary node, wherein the consensus protocol includes participation of the at least one secondary node and the at least one arbiter node;

evaluate election criteria at the at least one secondary node during an election period;

communicate i) a self-vote for a respective one of the at least one secondary node responsive to determining that the respective one of the at least one secondary node meets the election criteria, or ii) communicate a confirmation of a received vote of another secondary node responsive to determining that the another secondary node is more suitable to be elected as the new primary node based on the election criteria; and evaluate the operation log of the at least one arbiter node as part of the acts of determining.

19. The system of claim 18, further comprising a replication component configured to restrict write operations received from client computer systems to the at least one primary node having a primary role.

20. The system according to claim 18, wherein the election component is distributed through one or more nodes comprising the distributed database system.

21. The system according to claim 20, wherein the election component is distributed at least through the at least one secondary node and the at least one arbiter node.

* * * * *